CALLING LINE IDENTIFICATION APPARATUS

Filed March 4, 1949 6 Sheets-Sheet 1

FIG IA

INVENTOR.
JOHN E. OSTLINE
BY
Smith, Olsen & Baird
ATTYS.

May 19, 1953 J. E. OSTLINE 2,639,330

CALLING LINE IDENTIFICATION APPARATUS

Filed March 4, 1949 6 Sheets-Sheet 2

INVENTOR.
JOHN E. OSTLINE

BY
Smith, Olsen + Baird

ATTYS

CALLING LINE IDENTIFICATION APPARATUS

Filed March 4, 1949 6 Sheets-Sheet 3

INVENTOR.
JOHN E. OSTLINE

BY
Smith, Olsen & Baird
ATTYS.

INVENTOR.
JOHN E. OSTLINE
BY
Smith, Olsen & Baird
ATTYS.

May 19, 1953 J. E. OSTLINE 2,639,330

CALLING LINE IDENTIFICATION APPARATUS

Filed March 4, 1949 6 Sheets-Sheet 5

INVENTOR.
JOHN E. OSTLINE
BY
Smith, Olsen & Baird
ATTYS.

CALLING LINE IDENTIFICATION APPARATUS

Filed March 4, 1949 6 Sheets-Sheet 6

INVENTOR.
JOHN E. OSTLINE
BY
Smith, Olsen & Baird
ATTYS.

Patented May 19, 1953

2,639,330

UNITED STATES PATENT OFFICE 2,639,330

CALLING LINE IDENTIFICATION APPARATUS

John E. Ostline, Chicago, Ill., assignor to Automatic Electric Laboratories, Inc., Chicago, Ill., a corporation of Delaware Application March 4, 1949, Serial No. 79,677

26 Claims. (Cl. 179—7.1)

Figure 1:
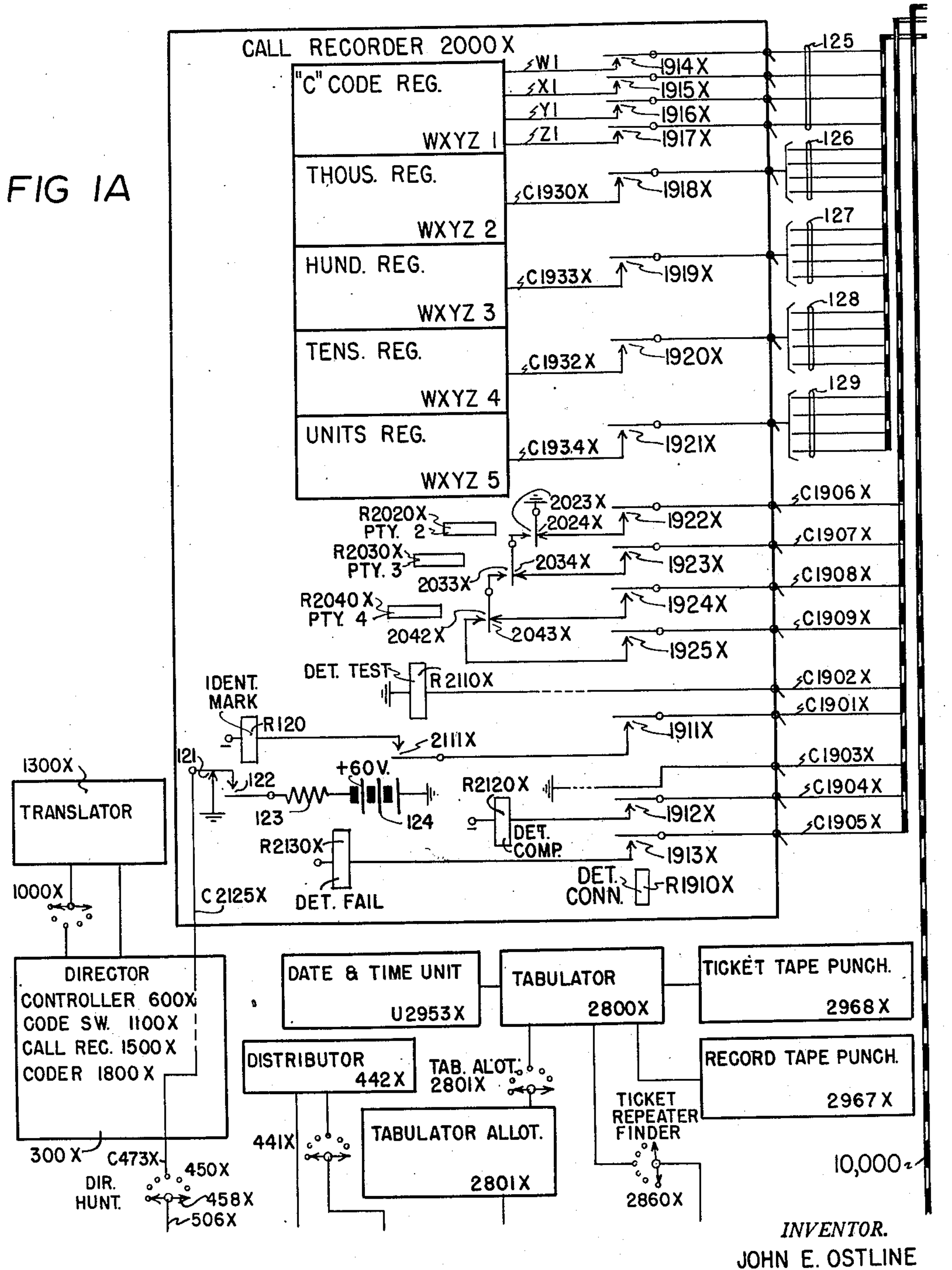

The present invention relates to telephone systems and, more particularly, to those systems in which line detecting apparatus is required to determine the identification of a calling line. More specifically, the present invention relates to line detecting apparatus adapted to be incorporated in an automatic toll ticketing telephone sysem of the character of that disclosed in the copending application of John E. Ostline, Serial No. 75,985, filed February 12, 1949, that employs line detecting or identifying apparatus of the type disclosed in the Grandstaff Patent No. 2,387,897, granted October 30, 1935. This detecting apparatus operates through a predetermined number of cycles of operation to detect the directory number of the calling subscriber line upon which has been initiated a toll call requiring the recording of certain items of record information in conjunction therewith.

While this line detecting apparatus incorporated in the system disclosed in the Ostline application Serial No. 78,985, filed February 12, 1949, is entirely satisfactory under ordinary operating conditions, it is somewhat slower in performing the line detecting function than is desired since it is designed to count the number of steps taken during each cycle of operation in searching for the particular calling line which is to be identified.

Accordingly, it is an object of the present invention to provide in a telephone system of the type noted an improved line detector which is directively operated substantially instantaneously to identify a calling directory number in response to the application of an identifying potential impressed upon the said calling line.

Another object of the invention is to provide a gas-filled discharge device individual to each line of the telephone system that has a pair of electrodes which are rendered conductive therebetween responsive to the application of an identifying potential applied to any calling one of the lines.

A further object of the invention is to provide a detector including a gas-filled discharge device for each line of the telephone system which device will not respond to the ordinary potentials applied thereto during the setting up of telephone connections and which will prevent false identification of a subscriber directory number.

It is a further object of the invention to provide a detector including gas-filled discharge devices of the two-element type which devices are economical to manufacture, small in size to facilitate mounting and standard commercial articles available on the market.

It is a further object of the invention to provide a detector comprising a gas-filled discharge device of the two-element type individual to each line of the telephone system and a plurality of settable registers which are controlled in response to the conductivity of any one of the devices to register a multi-digit designation corresponding to the directory number of the identified calling station.

Another object of the invention is to provide in an automatic telephone system, including party lines, an improved arrangement for identifying the directory number of the called stations on the called party lines which is selectively governed by the calling devices at the various calling party substations to render effective only those gas-filled discharge devices which are individual to the corresponding stations on each of the party lines in the telephone system.

A further object of the invention is to provide in an automatic telephone system, including party lines, which are arranged on a terminal-per-station basis, an improved detector provided with a gas-filled discharge device for each substation on each of the party lines of the system and which is operated incident to the extension of a connection from a given station on a given party line to render effective only the gas-filled discharge devices individual to the corresponding stations on all of the party lines, thereby to identify only the given station on the given party line as the calling station.

Another object of the invention is to provide in a telephone system a detector employing gas-filled discharge devices of the two-element type for each of the substations on a party line of a telephone system together with control apparatus which is selectively operated in accordance with the particular one of the calling stations on a multi-party line to provide operating potentials for the gas-filled discharge devices corresponding to the particular calling station on the multi-party line.

A still further object of the invention is to provide in a telephone system utilizing a detector to identify the directory numbers of calling subscriber substations an improved connector or final selector arranged to indicate the busy condition of a subscriber line if the said line is marked busy by the usual busy marking ground or if the said busy line has an identifying marking potential applied thereto for controlling the operation of the detector.

A still further object of the invention is to provide in a connector of the type noted above a new and novel busy test circuit arranged to eliminate short-circuiting of an identifying signal applied to a busy called line at a time when a connector is attempting to establish a connection with said busy called line.

Further objects and features of the invention pertain to the particular arrangement of the circuit elements of the system, whereby the above-outlined and additional operating features are attained.

Figures 1B, 6, 7, 8:
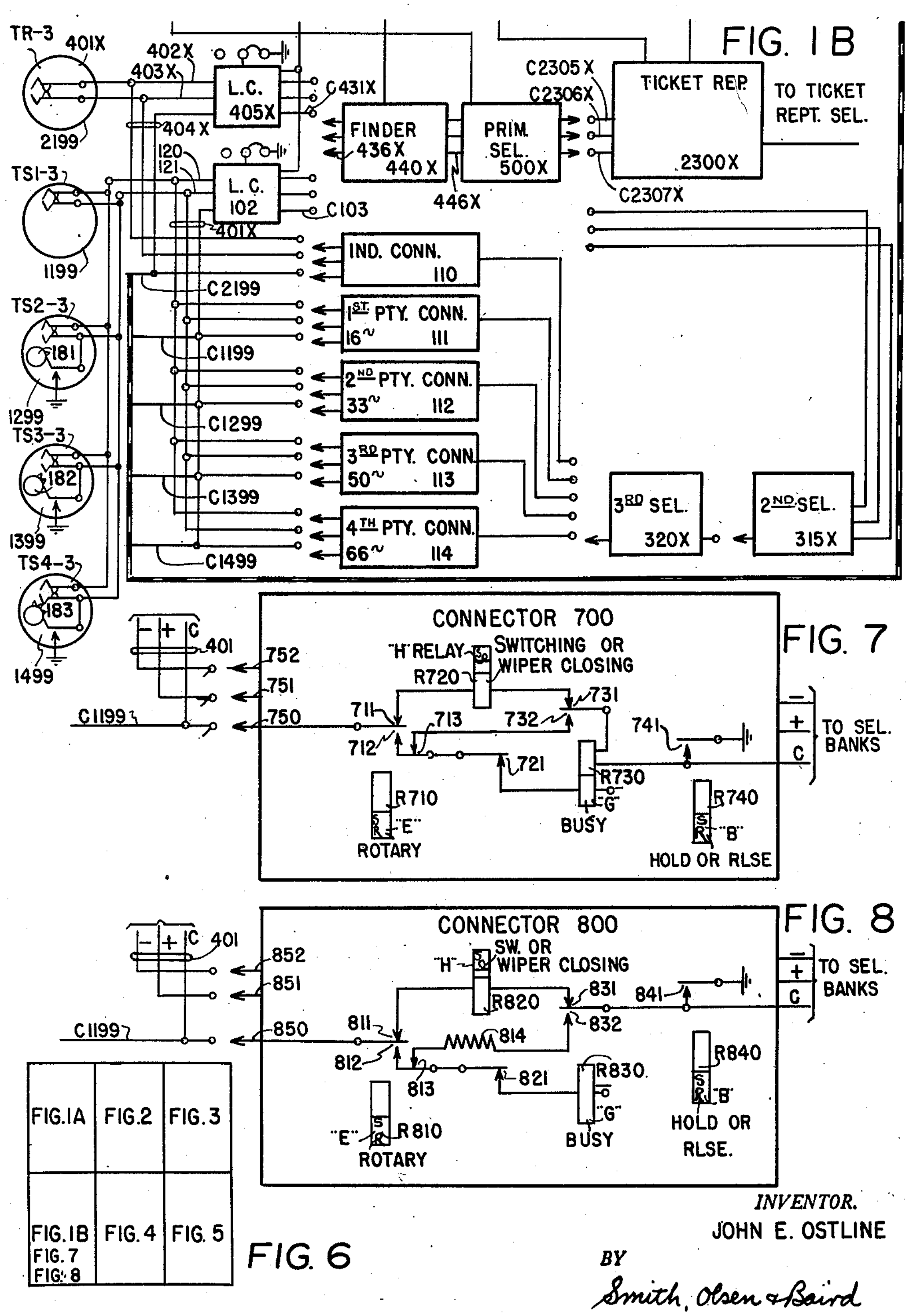

The invention, both as to its organization and method of operation, together with further objects and advantages thereof, will best be understood by reference to the following specification taken in connection with the accompanying drawings in which Figs. 1A, 1B and 2 to 5, inclusive, illustrate the apparatus incorporated in an exchange of the telephone system, which apparatus has incorporated therein the features of the invention as briefly outlined above; Fig. 6 illustrates the mode of combining Figs. 1A, 1B and 2 to 5, inclusive, to form a unified system; Fig. 7 illustrates one form of the improved busy test circuit for a conventional connector or final selector utilized in the system; and Fig. 8 illustrates another form of the improved busy circuit for a conventional connector or final selector utilized in the system. More particularly, Figs. 1A and 1B illustrate schematically a major portion of the apparatus incorporated in the telephone exchange; Figs. 2 to 5, inclusive, illustrate the details of the improved detector provided in the telephone exchange; and Figs. 7 and 8 illustrate respectively the improved busy testing circuit for conventional connectors or final selectors utilized in the exchange.

*The general arrangement of the telephone system*

As disclosed in the previously mentioned copending Ostline application, the automatic toll ticketing telephone system serves a large metropolitan area and the adjacent suburban areas which are divided into a number of zones, each of which includes one or more exchanges. More specifically, the areas served by the telephone system comprise, among other zones, the zone 35, which zone includes the FLorida 1, FLorida 2 and FLorida 3 exchanges. Each exchange in each zone comprises a 10,000 terminal unit, although it may not be initially installed to serve its ultimate terminal capacity. The lines terminating at each exchange in each zone comprise both private subscriber lines and party subscriber lines. The party subscriber lines are arranged on a terminal-per-station basis thereby to provide separate substation telephone directory numbers for each of the substations on the party lines.

The various exchanges in each zone are interconnected by suitable groups of trunk lines, not shown, and at least one such exchange is interconnected with one or more of the exchanges in other zones by suitable groups of interconnecting toll lines. In the automatic toll ticketing telephone system, various local and toll calls are set up by automatic switching apparatus under control of the subscriber substation equipment, including the usual calling device or dial. In order to facilitate the setting up of various connections, a universal numbering scheme is utilized whereby all called subscriber substations in the various exchanges in the various zones are dialed as listed in the telephone directory. Accordingly, the directory number of each subscriber substation in the telephone system comprises a code portion including three digits representing respectively the first two letters of the exchange name and the digit representing the number of the exchange in the zone and a numerical portion including four digits identifying the terminal of the particular station. At this point it is noted that the directory numbers of the party subscriber substations require no suffix digit in view of the fact that all of the party lines are arranged on a terminal-per-station basis and, consequently, each of the stations on each of the party lines is provided with an individual four-digit number identifying the particular terminal of the party station.

It should also be noted at this time that while the apparatus schematically illustrated in Figs. 1A and 1B of the telephone system represents the exchange apparatus located in the FLorida 3 exchange, as shown in the previously mentioned copending Ostline application, it should be understood that the line detecting apparatus illustrated in Figs. 2 to 5, inclusive, can also be utilized to determine the directory numbers of the calling substations in the FLorida 1 and FLorida 2 exchanges as well as those in the FLorida 3 exchange, if the exchange apparatus of the three-named exchanges are installed in the same telephone exchange building.

*The apparatus incorporated in the FLorida 3 exchange*

Preferably, the FLorida 3 exchange in the telephone system comprises apparatus substantially identical with that shown in the previously mentioned copending Ostline application, which apparatus includes, as is shown in Figs. 1A, 1B and 2A to 5, inclusive, automatic switching equipment serving a maximum of 10,000 terminals, one of the terminals terminating the line of the regular subscriber substation TR-3 and four of the terminals commonly terminating the line of the four party subscriber substations TS1-3, TS2-3, TS3-3 and TS4-3. The switching equipment comprises a number of line circuits individually associated with the subscriber lines terminating in the FLorida 3 exchange. For example, the line circuit 405X terminates the line conductors 402X and 403X of the regular subscriber substation TR-3 and the line circuit 102 terminates the line conductors 120 and 121 commonly connected to the four party subscriber substations, noted above, of the party line. At this point it is noted that the regular subscriber substation TR-3 and the party subscriber substations TS1-3, TS2-3, TS3-3 and TS4-3 are rendered free automatic local telephone service and automatic toll ticketing service to all exchanges in the metropolitan area located outside of the zone containing the FLorida 3 exchange for which charges are automatically established.

Before proceeding further with the description of the apparatus included in the FLorida 3 exchange, it should be noted that the apparatus schematically illustrated in Figs. 1A and 1B is provided with numerical designations identifying the apparatus and that some of these designations are provided with the suffix "X." In order to facilitate cross-referencing the respective units of equipment with the corresponding equipment shown in the previously mentioned copending Ostline application, like units of equipment in the present application have been given the same numerical designations as those appearing in the above-metioned copending application. In addition thereto, the numerical designations of the equipment in the present application are also provided with the suffix "X."

The switching equipment in the FLorida 3 exchange also comprises a group of finder switches, including the finder switch 440X, which has access to the line circuits 405X and 102 under control of the common distributor 442X and the finder selecting switch 441X. Each of the finder switches 440X is automatically selected for use in response to a call on any one of the subscriber lines under control of the distributor and associated finder selector. Each of the finders 440X is individually associated with a primary selector, such as the primary selector 500X and each of the primary selectors, in turn, is provided with a director hunter 450X having acccess to a group of directors including the director 300X.

Each of the directors in the FLorida 3 exchange includes a controller 600X, a code switch 1100X, a call register 1500X and a coder 1800X. It should be noted at this point that the director may require the translation of the code digits of a called exchange code registered therein in order to route the call over appropriate routing paths to the called exchange and that the translation of a called office code may include a different number of digits having different values from the number and values of the digits constituting the called office code. For performing the translation operation in connection with any call, the telephone exchange is provided with a translator 1300X, which is common to all of the directors of the exchange and which may be assigned for the individual use of a director by means of the translator assigner 1000X. The translator is only called into use when the director has ascertained that a translation is required and is released and made available to other directors as soon as the translator has registered the translated digits in the director.

Also, the FLorida 3 exchange is provided with a local switch train including the second selector 315X, the third selector 320X and the groups of connectors respectively including the individual connector 110, the first party connector 111, the second party connector 112, the third party connector 113 and the fourth party connector 114. The group of individual connectors, including the connector 110, have access over their associated bank contacts to the various individual subscriber substations, including the regular subscriber substation TR-3 terminating in the FLorida 3 exchange. The group of first party connectors, including the connector 111, have access over the associated bank contacts to the four-party lines terminating in the FLorida 3 exchange. The four-party lines are multiply connected to the bank contacts of the first, second, third and fourth party connectors 111 to 114, inclusive, so that a connector in each group has access to the party line terminating in its associated contact bank. The four party connectors are each arranged to transmit ringing currents of a different frequency over a connected party line so that the tuned ringer at each substation on the party line may be selectively signaled in accordance with the frequency of the ringing current transmitted thereto. More specifically, the first party connector 111 transmits a 16 cycle ringing frequency and will actuate the ringer at the first party substation TS1-3. The second party connector 112 will transmit a 33 cycle ringing frequency and will actuate the ringer at the second party substation TS2-3. The third and fourth party connectors 113 and 114 will respectively transmit 50 cycle and 66 cycle ringing frequency to actuate the respective ringers at the third and fourth party subscriber substations TS3-3 and TS4-3.

The various connectors or final selectors of the system are of conventional construction and arrangement and may be, for example, of the type illustrated in Fig. 48 of "Telephone Theory and Practice—Automatic Switching and Auxiliary Equipment" by Kempster B. Miller, published by McGraw-Hill Book Company, Inc., of New York in 1933, except that the testing circuit including the C wiper of the connectors is modified in accordance with either Fig. 7 or Fig. 8.

Further, the FLorida 3 exchange is provided with toll ticketing apparatus which comprises a number of groups of ticket repeaters, one of the groups including the ticket repeater 2300X, a detector 1900, a number of tabulators, such as the tabulator 2800X, a ticket tape punch 2968X, a record tape punch 2967X and a date and time unit U2953X. In order to associate one of the tabulators with a calling one of the ticket repeaters, there is also provided a tabulator allotter 2801X and a ticket repeater finder 2860X.

There is also provided in the FLorida 3 exchange a call recorder, such as the call recorder 2000X, individually associated with each director of the system. In Fig. 1A, various modifications have been schematically illustrated in the block diagram of the call recorder 2000X for the purpose of illustrating the manner in which the call recorder controls the detector 1900 illustrated in Figs. 2 to 5, inclusive, of the drawings. The call recorder 2000X also includes schematically illustrated registering apparatus for registering a digit of the FLorida 3 exchange code and the numerical digits of a directory number of a calling subscriber substation. The manner in which the detector 1900 and the call recorder 2000X cooperate will be described in detail hereinafter.

In considering the detector 1900, shown in Figs. 2 to 5, inclusive, it is noted that it is connected to each of the connector bank terminals of each of the subscriber lines terminating in the FLorida 3 exchange and that it is commonly associated with each of the call recorders, such as the call recorder 2000X, provided in the FLorida 3 exchange.

Each subscriber substation is provided with the usual substation apparatus, including a telephone instrument, a ringer and a calling device or dial. The calling devices disposed at the regular subscriber substations, such as the substation TR-3, and at the first party subscriber substations on a party line, such as the first party substation TS1-3, are of conventional construction and arrangement. The calling devices disposed at the second, third and fourth party subscriber substations, such as TS2-3, TS3-3 and TS4-3, are of the special construction and arrangement of that disclosed in the John E. Ostline Patent No. 2,410,520, granted November 5, 1946. The special dials of the type disclosed in the aforesaid patent, in addition to the set of impulsing springs, are provided with a set of cam springs which are utilized to identify the position of the calling subscriber substation on the associated party line whereby one ground impulse is transmitted from the calling second party subscriber substation, two ground impulses are transmitted from the calling third party substation and three ground impulses are transmitted from the calling fourth party substation in a manner more fully explained hereinafter.

The detector 1900 included in the FLorida 3 exchange has access to 10,000 terminals in the connector banks of the local switch train and comprises, as is partially shown in Figs. 2 to 5, inclusive, 100 group relays, such as the relay R210, 100 group marking relays, such as the relay R215, and 100 common group connecting relays, such as the relay R225. Each of the group relays is commonly connected through 100 resistors to 100 gas-filled discharge devices. The 100 discharge devices are individually connected to 100 identifying conductors which, in turn, are connected to 100 connector bank contacts terminating a particular 100 line group of subscriber lines. The 100 group relays, such as R210, the 100 group marking relays, such as R215, and the 100 common group connecting relays, such as R225, are divided into ten groups, comprising ten group relays, ten group marking relays, and ten common group connecting relays. Since each group relay, such as R210, is common to 100 identifying conductors, each group of ten similar relays will be connected to 1000 identifying conductors. Accordingly, each of the ten groups may then be identified by the hundreds group of connector bank contacts to which the identifying conductors are connected. For example, the group relay R210 is commonly connected to the 100 resistors R1100 to R1199 and the 100 gas-filled discharge devices G1100 to G1199 terminating the 100 identifying conductors C1100 to C1199, which conductors are individually connected to the connector bank contacts of the hundred subscriber substations whose directory numbers are 1100 to 1199, inclusive. This group may obviously be designated the 11 hundred group. The group relay R250 is common to the 100 identifying conductors C1200 to C1299, inclusive, and consequently is designated the 12 hundred group. The group relay R410 is common to the 100 identifying conductors C1300 to C1399, inclusive, and is designated the 13 hundred group. The group relay R450 is common to the 100 identifying conductors C1400 to C1499, inclusive, and is designated the 14 hundred group. The remaining six group relays, not shown, are respectively connected to six groups of 100 identifying conductors and are respectively designated 15 hundred group, 16 hundred group, 17 hundred group, 18 hundred group, 19 hundred group, and 10 hundred group. The group relays R230, R270, R430 and R470 are commonly connected respectively to the 100 indentifying conductors C2100 to C2199, inclusive, C2200 to C2299, inclusive, C2300 to C2399, inclusive, and C2400 to C2499, inclusive, and are respectively designated 21 hundred group, 22 hundred group, 23 hundred group and 24 hundred group. The remaining six group relays, not shown, are commonly connected to the corresponding identifying conductors in substantially the same manner as described above and are designated as the 25 hundred group to 29 hundred group, inclusive, and 20 hundred group. The remaining 80 group relays, not shown, are each commonly connected to 100 identifying conductors and are designated with the 100 group number corresponding to the number of the 100 group of connector bank contacts terminating the identifying conductors. In the above-described manner, each of the 100 groups of identifying conductors are designated by means of the commonly connected group relays with the thousands and hundreds digit representing the hundred group of lines commonly connected thereto.

The detector 1900 also comprises 100 tens and units marking relays respectively designated R00 to R99, inclusive, which are respectively connected to the hundred contacts on each of the 100 common group connecting relays, such as the relays R225, R245, R265, etc. More specifically, the 100 tens and units marking relays R00 to R99, inclusive, are, for example, connected to the 100 contacts designated 00 to 99, inclusive, of the common group connecting relay R225 of the 11 hundred group and to the corresponding contacts of each of the remaining 99 common group connecting relays of the detector 1900. One of the tens and units marking relays will be operated when they are connected through the contacts of a common group connect relay to the identifying conductors in order to mark the tens and units digits of the directory number of a calling subscriber line.

Furthermore, the detector 1900 is provided with a group of common relays including the detection complete relay R310, which is operated in series with one of the tens and units marking relays, a common group test relay R320, which is operated in series with any one of the operated group marking relays, a director test relay R330 and a start relay R370. The relays R330 and R370 cooperate to associate the detector 1900 with a call recorder, such as the call recorder 2000X. Furthermore, the detector 1900 is provided with three slow-to-release timer relays R340, R350 and R360 which are normally in their operated positions and which start to release sequentially as soon as the detector 1900 is associated with a call recorder. If the three timer relays noted above restore to normal before the directory number of a calling line has been determined, a detector failure signal will be transmitted to the call recorder and the detector 1900 will be disconnected from the associated call recorder so that it may be utilized in detecting the directory number of another calling line.

The detector 1900 is also provided with a call recorder finder 598 which comprises a rotary stepping switch having fifty contacts terminating as many as fifty call recorders. The call recorder finder 598 is utilized to find a call recorder that requires the use of the detector 1900 and associates the detector with the call recorder.

Finally, the detector 1900 is provided with four party relays R560, R570, R580 and R590 which are selectively operated in accordance with the position of the calling subscriber on a calling party line. The individual or party 1 relay R560 is also operated in the event that the call is initiated on a regular subscriber line since the calling device at all of the regular subscriber substations and at all of the first party subscriber substations on party lines are of conventional construction and arrangement. Each of the four relays selectively control four party control relays R510, R520, R530 and R540 in series with a group control relay R550. A group control terminal block TB502 is provided and terminates each of the contacts of the multi-contact party control relays R510 to R540, inclusive. The hundred group terminal block TB501 termintes the 100 conductors respectively connected to each of the 100 group relays, such as the relay R210. The various contacts of the multi-contact individual and party control relay R510 are jumpered to the various group relays, such as relay R210, containing identifying conductors corresponding to subscriber substations of both the individual and party 1 type. The contacts of the multi-contact party two control relay R520 are jumpered to the group relays, such as the relay R250, terminating identifying conductors corresponding to the party two subscriber substations on party lines. The contacts of the party three multi-contact control relay R530 are connected to the group relays, such as the group relay R418, terminating identifying conductors corresponding to the third party subscriber substations on party lines. Finally, the contacts of the party four multi-contact control relay R540 are connected to the group relays, such as the relay R450, terminating identifying conductors corresponding to the party four subscriber substations on party lines.

Referring again to the group marking relay R215 of the 11 hundred group, it will be seen that this relay will mark the WXYZ marking conductors 125, the WXYZ marking conductors 126 and the WXYZ marking conductors 127. These marking conductors respectively are connected to the WXYZ1 C code register, the WXYZ2 thousands register and the WXYZ3 hundreds register schematically illustrated in the call recorder 2000X. Furthermore, the various WXYZ marking conductors 125, 126 and 127 are multiply connected to corresponding terminals of the terminal blocks individually associated with all of the 99 remaining group marking relays of the detector 1900. The WXYZ marking conductors 128 and 129 are respectively connected to the WXYZ4 tens register and the WXYZ5 units register of the call recorder 2000X and will be marked in code form to register respectively the tens and units digits of the calling subscriber director number in accordance with the operated one of the tens and units marking relays R00 to R99, inclusive. It should be noted at this point that the tens and units marking relays R00 and R99, are shown in detail. The remaining 98 tens and units marking relays are schematically indicated by the two-digit numerical designations 01 to 98 inclusive, shown to the left of the tens digit WXYZ128 marking conductors and to the left of the units digits WXYZ129 marking conductors. These relays, when operated, control the associated contacts to mark the WXYZ128 and 129 marking conductors in accordance with the tens and units digits of the corresponding relay designation.

Each of the five registers WXYZ1 to WXYZ5, inclusive, of the call recorder 2000X are provided with four relays respectively designated W, X, Y and Z, which relays are operated to register digits in accordance with the following code:

| Grounded WXYZ Marking Conductor | Operated WXYZ Relays of Registered | Digit Registered |
|---|---|---|
| WX | WX | 1 |
| WY | WY | 2 |
| WZ | WZ | 3 |
| XY | XY | 4 |
| XZ | XZ | 5 |
| YZ | YZ | 6 |
| W | W | 7 |
| X | X | 8 |
| Y | Y | 9 |
| Z | Z | 0 |

*General operation of the telephone system*

Considering now the general operation of the telephone system, it is noted that when a metropolitan toll call is extended from one of the regular subscriber substations or one of the party subscriber substations in the FLorida 3 exchange to a called exchange in another zone, the toll ticketing apparatus included in the FLorida 3 exchange will cause a ticket tape punch mechanism and a record tape punch mechanism to produce perforated tapes containing various items of information pertaining to the call. The items of information contained on the tape perforated by the ticket tape punch mechanism includes the calling subscriber directory number comprising three digits indicative of the calling exchange and the number of the exchange and four digits indicative of the calling subscriber connector bank terminal number. In addition to the foregoing, the tape includes the directory number of the called subscriber substation, the rate applicable to the call, the time duration of the call, the class of the calling line, the month and day that the call was established and perhaps the hour and minute that the call was completed. In addition to the foregoing items of information, the tape produced by the record tape punch mechanism includes the items of information relating to the identity of various units of common equipment utilized in establishing the particular connection. Perforated tapes may, for example, at the end of a billing period, be used to control a printing mechanism which will print individual tickets corresponding to the various items of information perforated on the ticket tape and which printing mechanism will automatically operate in accordance with certain of the items of information to calculate the cost of the call and print the established cost on the associated ticket. The printing mechanism which is controlled by the record tape will produce a tabulated record containing the information of all of the toll calls established by the toll ticketing equipment together with the identification of the units of common equipment utilized in the establishment of each toll call.

The identification of the directory number or the connector bank terminal number of the calling regular subscriber substation or the calling party line subscriber substation in the FLorida 3 exxchange is performed by the detector 1900, as explained more fully below.

Assuming that a metropolitan toll call is initiated at the calling regular subscriber substation TR-3, whose connector bank terminal number is 2199, and is to be extended to a called subscriber substation in an exchange in another zone, the call is initiated when the subscriber removes his receiver from the switchhook of the associated telephone instrument. This operation completes a loop circuit over the line conductors 402X and 403X whereupon the line circuit 405X individual to the calling subscriber operates in the usual manner to cause the distributor 442X and the rotary switch 441X to select an idle finder 440X. The selected finder operates in the well-known manner to find the terminals connected to the line circuit individual to the calling subscriber. At this time the primary selector 500X individually associated with the finder 440X causes the director hunter 450X to associate an idle director, such as the director 300X, with the calling subscriber substation. At this time the director 300X operates in order to cause a dial tone signal to be returned to the calling regular subscriber substation TR-3 to indicate to the calling subscriber thereat that the directory number of the called subscriber may be dialed. The code portion of the called subscriber directory number as dialed by the calling subscriber is registered in the call register portion 1500X of the director 300X. This will indicate that the call is a metropolitan toll call which requires the use of the translator 1300X to provide routing digits necessary to extend the call to the called subscriber substation.

Accordingly, as soon as the third digit of the called office code is registered in the director 300X, the translator assigner 1000X is called into use and connects the single translator 1300X to the director 300X. As a result of this connection, the translator is operated in accordance with the three code digits of the called exchange and immediately registers in the coder portion 1800X of the director 300X the routing digits which must be utilized by the director 300X in setting up the connection. It will also control the director 300X to thereafter transmit certain of the digits of the called subscriber directory number as registered in the director 300X by the calling subscribed in order to complete the connection to the called subscriber substation. It will also control the director 300X so that the call recorder 2000X individually associated therewith will be utilized to register the directory number of the calling subscriber substation. The translator 1300X is now released from the director 300X and made available for use by other directors.

The director 300X now operates to transmit the routing digits registered therein by the translator and then the various digits registered in the call register portion 1500X of the director 300X over the director hunter 450X to the primary selector 500X. The primary selector 500X responds to the first digit received from the director 300X and operates to select a corresponding group of trunks and then operates to select an idle trunk in the selected group. For example, the primary selector 500X may operate to select the trunk including the conductors C2305X to C2307X extending to the ticket repeater 2300X. The next digit transmitted by the director 300X controls the ticket repeater selector (not shown) individually associated with the ticket repeater 2300X, and the ticket repeater selector, in turn, selects an idle trunk extending in the direction of the desired called exchange. The remaining digits are transmitted by the director 300X over the above-traced path to the trunk line extending to the next exchange whereby the switching equipment associated with the seized trunk line in the next exchange operates in accordance with conventional practice to extend the connection to the desired called subscriber substation in the called exchange.

As has been pointed out above, the registration of the called office code digits in the director 300X will cause the translator 1300X to control the call recorder 2000X in order to initiate operations whereby the directory number of the calling subscriber substation may be identified and registered in the call recorder 2000X. During the time that the director 300X is transmitting the various routing digits and digits of the called subscriber number in order to set up the connection, the call recorder 2000X operates to control the detector 1900. During the time the calling subscriber is dialing the digits of the called subscriber directory number, the director 300X is also operated to register in the call recorder 2000X whether the calling subscriber substation is a regular substation on an individual line or is a party subscriber substation on a party line and the number of the station on the party line in the event that the calling substation is on a party line.

Referring to the call recorder 2000X, it will be seen that three party relays are provided which are respectively designated R2020X, R2030X and R2040X. These relays are selectively operated depending upon the character of the calling subscriber substation. More specifically, if the calling subscriber substation is a regular subscriber substation or is the first subscriber substation on a party line, the three relays R2020X, R2030X and R2040X will remain in their restored positions. If the calling subscriber substation is the second, third or fourth subscriber substation on a party line, the three relays R2020X, R2030X and R2040X will be selectively operated and will be retained in their operated positions. The selection of the three relays named above are respectively controlled by the special cam contacts provided at the second, third and fourth subscriber substations on party lines. In the present example, it will be assumed that all of the relays R2020X, R2030X and R2040X are in their restored positions inasmuch as the call has been originated by the regular subscriber at substation TR-3.

When the call recorder 2000X is controlled by the translator 1300X, in the manner previously noted, to start the detector 1900, a direct ground potential, normally applied to the conductor C1902X, is removed therefrom and a resistance ground, through the winding of the detector test relay R2110X, is connected to the conductor C1902X. Simultaneously therewith, a direct ground potential is applied to the conductor C1903X. These conductors extend to the detector 1900 and the ground potential applied to the conductor C1903X operates the start relay R370. The substitution of the resistance ground potential for the direct ground potential on the conductor C1902X marks a contact in the bank of the call recorder finder 598 to indicate that the call recorder 2000X requires the use of the detector 1900.

In response to the operation of the start relay R370 the call recorder finder 598 finds the particular call recorder 2000X marked by the substitution of the resistance ground potential for the direct ground potential on the conductor C1902X. The detector test relay R2110X in the call recorder 2000X operates as soon as the call recorder finder 598 is associated therewith and causes the operation of the detector connect relay R1910X. The last-mentioned relay connects all of the conductors extending to the detector 1900 through to various relays and registers in the call recorder 2000X. In response to the last-mentioned relay operation, a ground potential is applied to the conductor C1906X thereby to operate the individual or party one relay R560 in the detector 1900. Also, the association of the call recorder 2000X with the detector 1900 causes the identification marking relay R120 in the call recorder 2000X to operate and apply a positive 60-volt booster battery 124 to the calling subscriber line and, consequently, to the identifying conductor individual thereto, such as the conductor C2199, in order to control the detector 1900. The detector 1900 is directively controlled in accordance with the positive 60 volt booster battery 124 to mark the five groups of WXYZ marking leads 125 to 129, inclusive, respectively in accordance with the exchange digit of the calling exchange and the thousands, hundreds, tens and units digits corresponding to the connector bank terminal number of the calling subscriber substation. The digits mentioned correspond to the directory number of the calling subscriber substation.

The call recorder 2000X registers the five digits identifying the exchange number and the terminal number of the calling subscriber substation and the detector 1900 is automatically disconnected from the call recorder 2000X. The call recorder 2000X, in conjunction with the director 300X, transmits the identification of the calling subscriber substation together with other information, in code form, over the director hunter 450X, the primary selector 500X to the ticket repeater 2300X, which code information represents certain items of record information pertaining to the present call and which is stored in the ticket repeater 2300X. At this point it is noted that the director 300X is so interlocked that it will not operate to transmit the last numerical digit to complete the setting up of the connection to the called subscriber substation, unless the detector 1900 has been operated to identify the calling subscriber substation and the director 300X has been operated to transmit all of the code information mentioned to the ticket repeater 2300X to be registered therein.

However, assuming that the detector 1900 registers the identity of the calling subscriber substation in the call recorder 2000X and the director 300X transmits all of the code information mentioned to the ticket repeater 2300X, the director 300X operates to transmit the last numerical digit of the called subscriber directory number in order to complete the setting up of the connection to the called subscriber substation. The detector 1900 is then automatically released from the call recorder 2000X within a predetermined elapsed time interval after these units of equipment have been associated. The director 300X and the associated call recorder 2000X are automatically released from association with the primary selector 500X as soon as the last numerical digit of the called subscriber directory number has been transmitted. At this time the various items of record information pertaining to the connection are registered in code form in the ticket repeater 2300X and when the subscriber at the called subscriber substation answers the call, the ticket repeater 2300X operates to begin the timing operation in order to establish the time duration of the established connection.

Subsequently, when the subscribers involved in the established connection replace their receivers upon the switchhooks of their associated telephone instruments, the switching apparatus involved in the connection is automatically restored to normal in a conventional manner. However, the ticket repeater 2300X and the associated ticket repeater selector (not shown) are not released since it is essential that all of the items of information registered in the ticket repeater 2300X, including the established time item, be transferred to a tabulator for the purpose of controlling the ticket tape punch and the record tape punch. Consequently, as soon as the connection is released in the manner noted above, the tabulator allotter 2801X is controlled in order to cause an idle one of the tabulators, such as the tabulator 2800X, to connect itself with the particular ticket repeater 2300X by way of the ticket repeater finder 2860X. The items of information pertaining to the established connection are then transferred from the ticket repeater 2300X to the connected tabulator 2800X and the ticket repeater 2300X is released. The tabulator 2800X controls the date and time unit U2953X and the record and ticket tape punch mechanisms whereby the record tape punch mechanism 2967X and the ticket tape punch mechanism 2968X are controlled in order respectively to produce a perforated tape containing a common record of the various items of record information and a perforated tape containing an individual record of the various items of record information pertaining to the established connection. As soon as the information stored in the tabulator and the date and time information have been perforated by the respective tape punch mechanisms, the various units of equipment involved in the perforating operations are restored to normal and, thus, made available for additional calls.

In view of the foregoing explanation of the mode of operation of the apparatus incorporated in the telephone system to set up a metropolitan toll call from the calling regular subscriber substation TR-3 in the FLorida 3 exchange to a called subscriber substation in an exchange in another zone and to produce perforated tapes whereby a toll ticket and a common record sheet may be produced of the various items of record information pertaining thereto, it will be understood that this apparatus is operative in a substantially identical manner to set up a metropolitan toll call from any calling subscriber substation and to produce perforated tapes containing a record of the various items of record information. For example, the apparatus is operative to set up a metropolitan toll call from any one of the calling party subscriber substations TS1-3, TS2-3, TS3-3 and TS4-3 connected to the party subscriber line, including the conductors 120 and 121, to a called subscriber substation in an associated exchange in another zone and to produce perforated tapes from which a toll ticket and a common record may be made of the various items of record information pertaining thereto. In this connection it is pointed out that when a metropolitan toll call is extended from any one of the calling party subscriber substations TS1-3, TS2-3, TS3-3 and TS4-3, the director 300X and the associated call recorder 2000X are selectively controlled by the calling device at the calling party subscriber substation in order to identify the position of the calling party subscriber substation on the associated party subscriber line and to transmit the identification to the director 300X and the call recorder 2000X. The call recorder 2000X then operates selectively to apply ground potential to one of the marking conductors C1906X, C1907X, C1908X or C1909X in accordance with the identification of the position of the calling party subscriber substation on the associated party line. More particularly, ground potential is respectively applied to the conductor C1906X, C1907X, C1908X and C1909X when the calling party subscriber substation is respectively the party subscriber substations TS1-3, TS2-3, TS3-3 and TS4-3.

The application of ground potential to any one of the conductors C1906X to C1909X, inclusive, governs the operation of the detector 1900 whereby the directory numbers of the respective calling party subscriber substations TS1-3, TS2-3, TS3-3 and TS4-3 are detected as 1199, 1299, 1399 and 1499. The detector 1900 then operates to mark the four digits of the numerical portion of the directory number of the calling party subscriber substation upon the groups of WXYZ marking conductors 126, 127, 128 and 129 and, in addition thereto, marks the group of WXYZ marking conductors 125 in accordance with the calling exchange identifying digit in the manner previously explained.

*Detailed operation of the detector 1900*

As previously explained in conjunction with the general operation of the telephone system incident to the setting up of the connection from the calling regular subscriber substation TR-3 in the FLorida 3 exchange to the called subscriber substation in a called exchange in another zone, the call recorder 2000X applies a ground potential to the start conductor C1903X and it substitutes a resistance ground potential for a direct ground potential on the hold conductor C1902X. The application of ground potential to the start conductor C1903X completes an operating circuit for energizing the winding of the start relay R370 in the detector 1900 thereby to cause the latter relay to operate. The substitution of the resistance ground potential for the direct ground potential on the hold conductor C1902X extending to the detector 1900 marks the call recorder 2000X, associated with the director 300X, as a calling call recorder in the bank contacts of the call recorder finder 598.

Upon operating, the start relay R370 completes, at its contacts 372, a circuit for energizing the finder magnet M595. The circuit for operating the magnet M595 depends upon whether the associated wiper 597 is standing on a contact terminating a hold conductor of a call recorder not requiring the use of the detector 1900. If, for example, the conductor C1902X has a direct ground potential applied thereto and the wiper 597 is in engagement with the contact terminating the conductor C1902X, a circuit is completed by way of the contacts 372 and 596 and the winding of the magnet M595 to battery. The magnet M595 operates over the above-traced circuit and incident thereto interrupts, at the contacts 596, its operating circuit, whereupon the magnet deenergizes and advances the wiper 597 an additional step in the clockwise direction into engagement with the next bank contact. The above-described cycle of operation will be recompleted each time the wiper 597 engages a contact in its associated contact bank terminating a hold conductor having direct ground potential applied thereto. Also, at its contacts 371, the start relay R370 connects the grounded winding of the director test relay R330 by way of the contacts 372 to the wiper 597. As long as the wiper 597 engages a grounded contact, the director test relay R330 is short-circuited and will not operate. However, as soon as the wiper 597 engages the hold conductor C1902X having a resistance ground potential applied thereto, the finder magnet M595 will not operate due to the resistance of the director test relay R2110X in the call recorder 2000X. The relay R2110X, however, operates in series with the magnet M595 and the director test relay R330 operates in multiple with the relay R2110X and in series with the magnet M595.

As soon as the director test relay R330 operates, at its contacts 334, it completes a locking circuit for the relay R330 and the relay R2110X which is in multiple with the contacts 596 of the magnet M595. At its contacts 332, the relay R330 interrupts a point in the normally completed circuit for the relay R360 of the group of timer relays, which relay now begins to slowly restore to normal due to its slow-to-release characteristics. At this point it should be noted that the timer relays R360, R350 and R340 are normally maintained in their operated positions and are arranged to successively restore to normal within a predetermined elapsed time interval. The last timer relay R340, upon restoring, completes, at its contacts 341, a circuit for registering in the associated call recorder the fact that the detector 1900 has failed to identify a calling subscriber directory number in the event that the identification has not been made within the predetermined time interval.

Referring now to the call recorder 2000X, it is noted that when the detector 1900 is associated therewith, the detector test relay R2110X is operated as has been previously pointed out. Upon operating, the relay R2110X completes a circuit (not shown) for operating the detector connect relay R1910X in order to connect all of the conductors of the call recorder to the detector 1900. Incident to the operation of the detector connect relay R1910, a circuit is completed from ground by way of the contacts 2024X and 1922X, the conductor C1906X and the winding of the individual or party one relay R560 to battery. The above-traced circuit is completed at this time in view of the fact that the call has been initiated by the calling subscriber at the regular subscriber substation TR-3 and in view of the fact that the three party relays R2020X, R2030X and R2040X in the call recorder 2000X are in their restored positions.

In response to the operation of the individual or party one relay R560, at its contacts 561, it completes a circuit including the winding of the individual and party one control relay R510 and the winding of the group control relay R550, which relays now operate in series. The relay R510 is a multi-contact relay having a large number of contacts which are closed upon the operation of the relays. Only three of the contacts of the relay have been illustrated in the drawings but as many as 35 of such contacts may be included on the same relay structure. If additional contacts are required, additional relays, such as relay R510, may be included in the operating circuit. Upon operating, the relay R510 completes a circuit from battery by way of contacts 562, contacts 1 of the operated relay R510, terminal 1 of the group control terminal block TB502 jumpered to terminal 11 of the hundred group terminal block TB501 and then to the winding of the group relay R210 in the 11 hundred group of identifying conductors. The other terminal of the winding of the group relay R210 is multiply connected through the 100 resistors R1100 to R1199, inclusive, to one electrode each of the gas-filled discharge devices G1100 to G1199, inclusive. The battery potential extended over the above-traced circuit to the winding of the group relay R210 is the regular telephone exchange battery having a voltage of approximately 50 volts and having the positive pole of the battery grounded. The symbol for the negative exchange battery as is illustrated at the contacts 562 is used in the drawings to indicate the negative terminal of the 50 volt exchange battery which has its positive terminal grounded. This same symbol is utilized throughout the drawings to indicate the exchange battery described above.

The above description of the manner in which the negative exchange battery is applied to the winding of the group relay R210 in the 11 hundred group of identifying conductors is applied in substantially the same manner to each of the remaining hundred groups of identifying conductors which are connected to individual subscriber lines and to the party one subscriber substations of all party subscriber lines. All of the group relays, such as group relay R210 associated with all of the identifying conductors in the groups noted above are prepared for operation at this time in the same manner as the group relay R210. For example, battery potential is also extended by way of the contacts 562, contact 2 of relay R510, terminal 2 of the group control terminal block TB502 jumpered to the terminal 21 of the hundred group terminal block TB501 to the winding of the group relay R230 of the 21 hundred group identifying conductors. The other terminal of the winding of the relay R230 is multiply connected by way of the 100 ressitors R2100 to R2199, inclusive, to one of the electrodes of each of the gas-filled discharge devices G2100 to G2199, inclusive, individually associated with the 100 identifying conductors C2100 to C2199, inclusive. The circuits for the remaining group relays associated with the hundred groups of identifying conductors corresponding to the individual subscriber substations or to first subscriber substations on party lines are exactly the same as has been described above.

The group relays associated with the hundreds groups of identifying conductors corresponding to the identifying conductors of the second, third and fourth party subscriber substations are not prepared for operation.

When the group control relay R550 is operated in series with the individual and party one control relay R510, at its contacts 551, it applies direct ground potential to the conductor C1901X extending to the call recorder 2000X. This ground potential is further extended by way of the contacts 1911X of the operated detector connect relay R1910X, the contacts 2111X of the operated detector test relay R2110X and the winding of the identification marking relay R120 to battery. The operation of the relay R120 signals the call recorder 2000X that the detector 1900 is now in a condition to be operated to identify the terminal number of the calling subscriber substation. Upon operating, the relay R120, at its contacts 121 and 122, substitutes a positive 60 volt booster battery potential for the direct ground potential applied to the conductor C2125X.

It may be well to mention at this time that the direct ground potential is normally applied by way of the conductor C2125X and normally utilized, during the course of a connection, to maintain the finder 440X and the line circuit 405X in their operated positions, to busy these units of equipment to other apparatus having access thereto, and to apply a busy marking ground potential to the connector bank contacts of all connectors having access to the terminals of the calling subscriber line. These circuits extend from ground by way of the contacts 121, the conductor C2125X, the director 300X, the conductor C473X, the wiper 458X of the director hunter 450X, the conductor C506X, the primary selector 500X, the conductor C446X, the finder 440X, the wiper 436X, the conductor C431X, the line circuit 405X, the C conductor of the connector normals in the cable 404X to the identifying conductor C2199 individual to the subscriber substation TR-3 and to the contacts in the banks of all of the individual connectors, such as the connector 110, having access to the calling subscriber substation TR-3. The direct ground potential applied to this circuit busies the calling subscriber substation to all calls intended for the subscriber at substation TR-3. The direct ground potential applied to the identifying conductor C2199 will not cause any operation in the detector 1900.

However, as soon as the relay R120 in the call recorder 2000X operates and connects the positive 60 volt booster battery 124 by way of the resistor 123 and the contacts 122 over the above-traced circuit to the identifying conductor C2199, an operating potential is provided for breaking down the gas-filled discharge device in the detector 1900 individual to the calling subscriber substation TR-3 whose terminal number is 2199. The circuit path over which the booster battery potential 124 is applied to the identifying conductor individual to the calling regular subscriber substation may be traced from the positive 60 volt booster battery 124, the resistor 123, contacts 122, the conductor C2125X extending through the director 300X to the conductor C473X, the wiper 458X of the director hunter 450X, the conductor C506X, the primary selector 500X, the conductor C446X, the finder 440X, the wiper 436X, the conductor C431X, the line circuit 450X, the C conductor of the connector normals in the cable 404X, the identifying conductor C2199 and then through the cable 10,000 to the cable 2000 and the left-hand electrode of the gas-filled discharge device G2199. The right-hand electrode of the device G2199 is now connected to the negative exchange battery of approximately 50 volts over the previously described circuit including the resistor R2199 and the group relay R230 of the 21 hundred group of identifying conductors. The potential difference across the electrodes of the gas-filled discharge device G2199 is now approximately 110 volts thereby causing the gas-filled discharge device G2199 to break down and become conductive.

As soon as the gas-filled discharge device G2199 becomes conductive, the group relay R230 operates to indicate to the detector 1900 that the terminal number of the calling subscriber substation TR-3 is in the 21 hundred group of identifying conductors. The gas-filled discharge devices provided in the detector 1900 are preferably type NE-2 neon glow lamps manufactured by the General Electric Company.

As soon as the group relay R230 operates, at its contacts 231, it completes an obvious circuit for the left-hand winding of the group marking relay R235. As soon as the above-traced circuit is completed, the relay R235 operates to complete, at its contacts 236, a circuit for operating the common group test relay R320 in series with the right-hand winding of the group marking relay R235. This circuit may be traced from the negative exchange battery and then through the right-hand winding of the relay R235, the contacts 236, the conductor C322, the winding of the relay R320 and the contacts 333 to ground. The relay R235 is locked in its operated position over the above-traced circuit and the common group test relay R320 operates in series therewith. Upon operating, the common group test relay R320, at its contacts 321, prepares a point in the circuits to be described hereinafter for indicating to the call recorder 2000X that the detector 1900 has identified the directory number of the calling subscriber at substation TR-3.

As a further result of the operation of the group marking relay R235, it closes its contacts 238 to 243, inclusive. These contacts are connected to the terminal block TB244 which terminates the three groups of WXYZ marking conductors 125, 126 and 127. The WXYZ125 marking conductors are provided for the purpose of indicating the exchange number of the calling exchange code which, in the present example, is the digit "3" inasmuch as the calling subscriber substation is terminated in the FLorida 3 exchange. Accordingly, the contacts 243 and 242 of the relay R235 are jumpered respectively to the W and Z marking conductors of the WXYZ125 marking conductors in accordance with the digit "3" of the WXYZ code previously shown. The contacts 241 and 240 are respectively connected to the W and Y marking conductors of the WXYZ126 marking conductors to indicate the digit "2" corresponding to the first or thousand digit of the directory number 2199 of the calling subscriber substation TR–3. The contacts 239 and 238 are respectively jumpered to the W and X marking conductors of the WXYZ127 marking conductors to indicate the digit "1" of the second or hundred digit of the calling subscriber directory number.

From the foregoing it will be understood that when any calling subscriber having a directory number in the 21 hundred group makes a call, the gas-filled discharge device individual to the particular calling subscriber substation will be rendered conductive and cause the operation of the group relay R230. Consequently, the group marking relay R235 will also operate and mark the group marking conductors WXYZ125 to 127, inclusive, in accordance with the C digit of the called office code and the thousands and hundreds digits of the calling subscriber four-digit directory number.

The detector 1900 having determined a portion of the digits of the calling subscriber directory number, as noted above, must now determine the remaining two digits corresponding to the last two digits of the calling subscriber directory number. Accordingly, as soon as the group marking relay R235 operates, at its contacts 237, it completes an obvious circuit for operating the common group connect relay R245. This relay is illustrated with 100 make contacts designated 00 to 99, inclusive, but it should be understood, for example, that ten relays having ten contacts each or four relays having 25 contacts each may be substituted for the single relay R245 and operated simultaneously to complete circuits through 100 make contacts. Upon operating, the relays R245 will connect through its 100 make contacts the 100 identifying conductors C2100 to C2199, inclusive, to the 100 tens and units marking relays R00 to R99, inclusive. It should be understood that while only two of the 100 relays have been shown, that is the relay R00 and R99, the remaining 98 relays are connected in substantially the same manner as the above-named relays to the correspondingly designated 98 identifying conductors. It should also be understood that each of the tens and units marking relays are provided with certain make contacts which are closed in response to the operation of any one of the relays to mark the WXYZ marking conductors 128 and 129 in accordance with the tens and units digits corresponding to the designation of the operated relay. It should also be understood that each of the 100 tens and units marking relays R00 to R99, inclusive, are connected by way of the conductors C00 to C99, inclusive, to the correspondingly numbered contacts of each of the common group connect relays, such as the relay R245, associated with each of the hundred groups of identifying conductors. By this means the 100 tens and units marking relays may be individually associated with the 100 identifying conductors in each of the hundred groups of 100 identifying conductors.

As soon as the 100 tens and units marking relays R00 to R99, inclusive, are individually associated with the 100 identifying conductors C2100 to C2199, inclusive, in response to the operation of the common group connect relay R245, the positive 60 volt booster battery 124 connected to the identifying conductor C2199 is now extended by way of the contacts 99 of the relay R245 and the conductor C99 to the winding of the tens and units marking relay R99 and the winding of the common group relay R310 to the negative terminal of the 50 volt exchange battery. As soon as the above-traced circuit is completed, the tens and units marking relay R99 and the common group relay R310 operate. Upon operating, the relay R99 applies ground potential to the Y conductor of the WXYZ128 marking conductors to mark these conductors in accordance with the tens digit "9" of the numerical portion of the calling subscriber directory number 2199 and it applies ground potential to the Y conductor of the WXYZ129 marking conductors to mark these conductors in accordance with the units digit "9" of the numerical portion of the directory number 2199 of the calling subscriber at substation TR–3.

Referring now to the call recorder 2000X, it will be seen that when the WXYZ marking conductors 125 to 129, inclusive, are marked in code form in accordance with the digits 32199, the relays in the registers WXYZ1 to WXYZ5, inclusive, will operate in the well-known manner over the operated contacts 1914X to 1921X, inclusive, of the relay R1910X and will lock, at their operated positions, to store the five digits noted above until they are subsequently transferred by the director 300X to the associated ticket repeater 2300X.

When the common group relay R310, in the detector 1900, is operated in series with the tens and units marking relay R99, it completes, at its contacts 311, a circuit for operating the detection complete relay R2021X in the call recorder 2000X. This circuit may be traced from ground by way of the contacts 311 and 321, the conductor C1904X extending to the call recorder 2000X, contacts 1912X, and the winding of the relay R2120X to battery. The operation of the relay R2120X signals the call recorder 2000X that the detector 1900 has operated in accordance with the directory number of the calling subscriber substation TR–3 and that it may be released from the call recorder 2000X and thus be made available to other call recorders. Upon operating, the relay R2120X controls the detector start relay (not shown) in the call recorder 2000X, which relay, in turn, removes the starting ground potential from the conductor C1903X, disconnects the detector test relay R2110X from the conductor C1902X, and applies direct ground potential to the conductor C1902X. When the detector test relay R2110X is disconnected from the conductor C1902X, the relay restores to normal and opens a point in the circuit (not shown) for the detector connect relay R1910X which relay now restores to normal. Upon restoring, the relay R1910X opens its contacts 1911X to 1925X, inclusive, thereby to disconnect the various conductors of the detector 1900 from the call recorder 2000X. As a further result of the restoration of the relay R2110X, at its contacts 2111X, it opens a point in the circuit of the identification marking relay R120, which relay restores to normal to disconnect the positive 60 volt booster battery 124 from the previously described circuit including the identifying conductor C2199 and substitutes in place thereof the direct ground busy marking potential which maintains the various switches and relays operated and which maintains the calling line busy in the connector bank terminals of all connectors having access thereto.

In the detector 1900 the start relay R370 will restore to normal as soon as the starting ground is removed from the conductor C1903X by the call recorder 2000X. Upon restoring to normal, the relay R370 opens its contacts 371 and 372 to disconnect the director test relay R330 from the circuit including the winding of the finder magnet M595 and to disconnect the circuit including the hold conductor C1902X from the finder magnet M595. The director test relay R330 now restores to normal and opens, at its contacts 334, a further point in its holding circuit.

It may be well to mention at this time that the substitutions of the direct ground potential for the resistance ground potential on the conductor C1902X will mark the call recorder 2000X as a non-calling call recorder to the call recorder finder 598. In other words, if the start relay R370 is maintained in an operated position from another call recorder at the time the call recorder 2000X dismisses the detector 1900, the call recorder finder 598 will automatically advance its wipers to associate the detector 1900 with another calling call recorder. With the relay R370 maintained in its operated position, the substituted direct ground potential on the conductor C1902X is extended by way of the wiper 597, the contacts 372 and 596 to the winding of the finder magnet M595. In multiple with the above-traced circuit the direct ground potential on the conductor C1902X is also extended by way of the wiper 597, the contacts 372 and 371 and the winding of the relay R330 to ground. Accordingly, the director test relay R330 is short-circuited and restores to normal and opens its locking circuit including the contacts 334. The finder magnet M595 operates when the above-traced circuit is completed and interrupts the circuits, at its contacts 596, thereby to cause the magnet to restore and advance the wiper 597 into engagement with the next contact in its associated contact bank. If the call recorder associated with the next contact is not calling for the detector 1900, a direct ground potential will again be encountered by the wiper 597 and cause the cycle of operation to be recompleted. In this manner, the magnet M595 advances the wiper 597 until it engages the bank contact terminating the call recorder requiring the use of the detector 1900.

From the foregoing description of the operation of the start relay R370, the director test relay R330, and the call recorder finder 598 it should be understood that if no other call recorder requires the use of the detector 1900 at the time the call recorder 2000X dismisses the detector 1900, the relays R370 and R330 will restore to normal and the call recorder finder 598 will retain its wiper 597 in engagement with the hold conductor C1902X of the call recorder 2000X. It should also be understood that if another call recorder requires the use of the detector 1900 at the time it is dismissed by the call recorder 2000X, the director test relay R330 is restored to normal and the start relay R370 is maintained in its operated position by the call recorder requiring the use of the detector 1900. In the latter case the magnet M595 of the call recorder finder 598 will automatically advance the wiper 597 step-by-step in a clockwise direction until it engages a contact terminating a hold conductor individual to the call recorder requiring the use of the detector 1900.

When the director test relay R330 restores to normal in the manner previously described, it opens, at its contacts 331, a point in a circuit including the conductor C1905X for indicating that the detector 1900 has failed to identify the directory number of the calling subscriber. The last-mentioned circuit cannot be completed, however, until the timer relays R360, R350 and R340 have slowly restored to normal in the order noted above before the director test relay R330 has been restored to normal. As a further result of the restoration of the relay R330, at its contacts 332, it completes an obvious circuit for operating the timer relay R360 which relay, in turn, will cause the operation of the timer relays R350 and R340. Finally, the relay R330, upon restoring, as its contacts 333, interrupts a point in the locking circuit for the common group test relay R320 and the right-hand winding of the group marking relay R235. These relays restore at this time and interrupt points in various other circuits which will be described hereinafter.

Referring now to the call recorder 2000X, it will be recalled that the restoration of the detector test relay R2110X caused the detector connect relays R1910X to restore and disconnect the detector 1900 from the call recorder 2000X as previously noted and it caused the identification marking relay R2120 to restore to normal to substitute a direct ground potential for the positive 60 volt booster battery 124 on the identifying conductor C2199. As soon as the detector 1900 is disconnected from the call recorder 2000X, the ground potential applied to the conductor C1906X is disconnected at the contacts 1922X and causes the individual or party one relay R560 in the detector 1900 to restore to normal. Upon restoring, the relay R560, at its contacts 561, interrupts the circuit for the relays R510 and R550 which now restore to normal. Also, at its contacts 562, the relay R560 disconnects the negative exchange battery potential from all of the contacts of the individual and party one control relay R510. The removal of the negative exchange battery potential from the above-mentioned contacts occurs at approximately the same instant that the positive 60 volt booster battery 124 is removed from the identifying conductor C2199. The removal of the negative exchange battery from the contacts of the relay R510 opens the circuit for the group relay R230 associated with the 21 hundred group of identifying conductors and it also removes the negative exchange battery from all of the other group relays associated with identifying conductors of both individual subscriber substations and of first subscriber substations on party lines. At this time, the positive 60 volt booster battery 124 is removed from the left-hand electrode of the gas-filled discharge device G2199 and a direct ground potential is applied thereto. The right-hand electrode of the gas-filled discharge device G2199 has no potential applied thereto since the negative 50 volt exchange battery has been removed therefrom by the opening of contacts 562. The gas-filled discharge device G2199 is accordingly rendered non-conductive and the group relay R230 is restored to normal. Upon restoring, the relay R230, at its contacts 231, interrupts the circuit for the left-hand winding of the group marking relay R235. Since the circuit for the right-hand winding of the relay R235 is also interrupted, in the manner pointed out above, the relay R235 restores to normal and interrupts the various circuits including its contacts 236 to 243, inclusive. The contacts 236 of the relay R235 interrupts a further point in the previously described locking circuit for the right-hand winding of the relay and the contacts 238 to 243, inclusive, remove the marking ground potentials from the WXYZ marking conductors 125 to 127, inclusive. Finally, at its contacts 237, the relay R235 interrupts the circuit for the common group connect relay R245 which also restores to normal.

Before describing the operations which result from the restoration of the relay R245, it is advisable at this time to explain the possible transitory circuits which may be closed during the interval between the restoration of the relay R230 and the restoration of the relay R245. More particularly, the identifying conductors, such as conductors C2100 to C2199, inclusive, which are connected to busy subscriber lines in the 21 hundred group of subscriber lines will have ground potential applied thereto and the idle subscriber lines will have negative 50 volt exchange battery connected thereto through the winding of the cutoff relay (not shown) in the line circuits of the associated subscriber lines. Since these conductors terminate in the left-hand electrodes of the gas-filled discharge devices G2100 to G2199, inclusive, a potential difference of approximately 50 volts may appear across electrodes of two or more of the gas-filled discharge devices. However, since the right-hand electrodes of these devices were multiply connected through the resistors, such as the resistors R2100 to R2199, inclusive, each of which is approximately 27,000 ohms, the voltage across any pair of electrodes is insufficient to break down the device and cause it to become conductive. In addition to the foregoing, the ground or resistance battery potential applied to the various identifying conductors C2100 to C2199, inclusive, as noted above, may be extended by way of the contacts of the common group connect relay R245 through the corresponding tens and units marking relays in multiple therewith and the winding of the detection complete relay R310 to battery. However, the tens and units marking relays R00 to R99, inclusive, and the relay R310 are marginal and are designed not to operate over a circuit including the 50 volt negative exchange battery. These relays, as previously noted, will operate, however, when the positive 60 volt booster battery 124 is connected in series with the negative 50 volt exchange battery. From the foregoing, it will be understood that the various relays and apparatus involved in the circuit for identifying the directory number of a calling subscriber line are specifically designed not to falsely operate in response to the connection of the normal 50 volt negative exchange battery.

When the common group connect relay R245 restores to normal in the manner previously noted, it disconnects the 100 tens and units marking relays R00 to R99, inclusive, from the 100 identifying conductors C2100 to C2199, inclusive. The operated tens and units marking relay R99 restores to normal and the detection complete relay R310 also restores to normal. At its contacts 311, the relay R310 opens an additional point in the detection complete circuit including the conductor C1904X. At this time all of the operated relays in the detector 1900 have been restored to normal except the timer relays R360, R350 and R340 which relays are normally maintained in their operated positions. The detector 1900 is now completely released and is available for use by the call recorder portion of other directors in the telephone system.

In view of the foregoing explanaton of the mode operation of the director 1900, it will be understood that it was directively controlled to register the C digit of the calling exchange code and the four digits of the calling subscriber directory number in the call recorder 2000X in response to the application of the positive 60 volt booster battery to the identifying conductor individual to the calling subscriber substation TR-3 whose directory number is FLorida 3-2199.

In the above description of operation of the detector 1900 it was pointed out that the timer relays R360, R350 and R340 are normally in their operated positions. It will be recalled that when the detector 1900 is associated with the call recorder 2000X, the director test relay R330 operated and, at its contacts 332, interrupted the circuit for the first timer relay R360 which slowly restored to normal. Also, at the time the director test relay R330 operated, the call recorder 2000X was controlled to apply positive 60 volt booster battery 124 to the identifying conductor C2199 individual to the calling subscriber at substation TR-3. The application of the booster battery potential to the identifying conductor C2199 first caused the gas-filled discharge device G2199 to break down and this, in turn, caused the sequential operation of the relays R230, R235, R245 and R320. The relay R235, as previously noted, registered the C digit and the thousands and hundred digits of the calling subscriber directory number in the call recorder 2000X. In response to the operation of the relay R245, the detector 1900 was then controlled to operate the tens and units marking relay R99 and, in series therewith, the detection complete relay R310. The relay R99 registered the tens and units digits of the calling subscriber number in the call recorder 2000X. The operating time of the various relays is exceedingly fast and, consequently, the elapsed time of the detection operation, i. e., from the time the detector is seized by the operation of relay R330 and until detection has been completed, as indicated by the operation of relay R310, is considerably less than the releasing time of the three timer relays R360, R350 and R340. From the foregoing it will be understood that the normal operation of the detector 1900 to register the directory number of a calling subscriber substation will be completed well in advance of the restoring time of the three timer relays noted above. However, if, for any reason, the registration of the calling subscriber directory number is not completed, the detection complete relay R310 will not be operated to disconnect the detector 1900 from the call recorder 2000X.

When the slow-to-release timer relay R360 restores to normal after the seizure of the detector 1900, at its contacts 361, it interrupts the circuit of the timer relay R350 which also slowly restores to normal. When the timer relay R350 restores to normal, at its contacts 351, it opens the circuit of the timer relay R340 which slowly restores to normal and, at its contacts 341, applies ground potential to the detection incomplete conductor C1905X. Whenever the relay R340 restores to normal before the detector 1900 has been disconnected from a call recorder 2000X, due to the failure of the detector to register the identity of a calling subscriber directory number, the above-mentioned ground potential will be applied to the conductor C1905X and thus cause the operation of the detector failure relay R2130X in the call recorder 2000X. The relay R2130X, upon operating, will register the fact that the detector 1900 has failed to detect the identity of the calling subscriber substation and it will automatically disconnect the detector 1900 from the call recorder 2000X in order to render the detector 1900 available for use by other call recorders. Any operated relays in the detector 1900 will be restored to normal and the call recorder finder 598 will be operated in the manner previously described to associate the detector 1900 with another calling call recorder. As a further result of the disconnection of the detector 1900 from the call recorder 2000X the timer relays R360, R350 and R340 will be reoperated in the manner previously described to prepare the timer to initiate a new time cycle in response to the association of the detector 1900 with another call recorder.

As a further result of the operation of the detector failure relay R2130X, the call recorder 2000X, the director 300X, and the ticket repeater 2300X will be operated in the manner described in detail in the above-mentioned Ostline application to complete a connection from the calling subscriber substation via the finder 440X, the primary selector 500X and the repeater 2300X, to an intercepting operator position.

In view of the foregoing explanation of the mode of operation of the detector 1900 to detect the directory number of the calling regular subscriber substation TR-3 in the FLorida 3 exchange whose connector terminal number is 2199, it will be understood that the detector 1900 is operative in a substantially identical manner to detect and register the directory number of any calling subscriber substation in the FLorida 3 exchange. For example, the detector 1900 is operative to detect the directory numbers of the calling party subscriber substations TS1-3, TS2-3, TS3-3, TS4-3 connected to the party subscriber line conductors 120 and 121 and having the connector terminal or directory numbers 1199, 1299, 1399 and 1499. When the calling party subscriber at substation TS4-3 initiates a metropolitan toll call in the manner previously described, the director 300X operates to establish a connection in cooperation with the translator 1300X and the call recorder 2000X. Incident to the actuation of the calling device at the calling subscriber substation TS4-3 to register the digits of the called subscriber directory number in the director 300X, the cam 183 at the subscriber substation is actuated to transmit three ground pulses over the calling subscriber line thereby to operate the party 2, party 3 and party 4 relays R2020X, R2030X and R2040X and indicate that the calling party subscriber substation is the fourth station on the calling party line.

Shortly after the registration of the called office code portion of the called subscriber directory number, the detector 1900 is associated with the call recorder 2000X, in the manner previously described, due to the operation of the detector connect relay R1910X. At this time a circuit is completed for operating the party 4 relay R590 in the detector 1900 to indicate that the calling subscriber identifying potential will be found in one of the groups of 100 identifying conductors connected only the fourth party subscriber substations on party lines. The circuit for operating the party 4 relay R590 may be traced from ground by way of the contacts 2023X, 2033X, 2042X and 1925X, the conductor C1909X and the winding of the relay R590 to battery. Upon operating, the relay R590, at its contacts 591, completes a circuit for operating the party 4 control relay R540 and the group control relay R550 in series. As a further result of the operation of the relay R590, at its contacts 592, it connects the 50 volt negative exchange battery to all of the contacts of the party 4 control relay R540 and when this relay is operated, as noted above, it extends the 50 volt negative exchange battery to the various terminals on the group control terminal block TB502. The upper contact of the relay R540 is connected to the terminal 121 of the terminal block TB502 and jumpered to the terminal 14 of the hundred group terminal block TB501. This terminal, in turn, is connected to the winding of the group relay R450 which is common to the 100 gas-filled discharge devices G1400 to G1499 of the 14 hundred group of the fourth party substations on party lines. The other contacts of the party 4 control relay R540 are jumpered at the terminal blocks TB501 and TB502 in a similar manner to all of the other group relays, such as relay D450, which are associated with identifying conductors corresponding to the fourth party subscriber substations on party lines in other hundred groups of lines.

In view of the above description of operation of the detector 1900, it will be understood that the detector is prepared to identify directory numbers of only the fourth party subscriber directory numbers whenever the party 4 relays R590 and R540 are operated. It should be noted at this time that in the event that the party 2 relays R570 and R520 or the party 3 relays R580 and R530 are operated, the detector 1900 will be prepared to identify either a second party subscriber substation or a third party subscriber substation in substantially the same manner as has been previously described.

Figure 2:
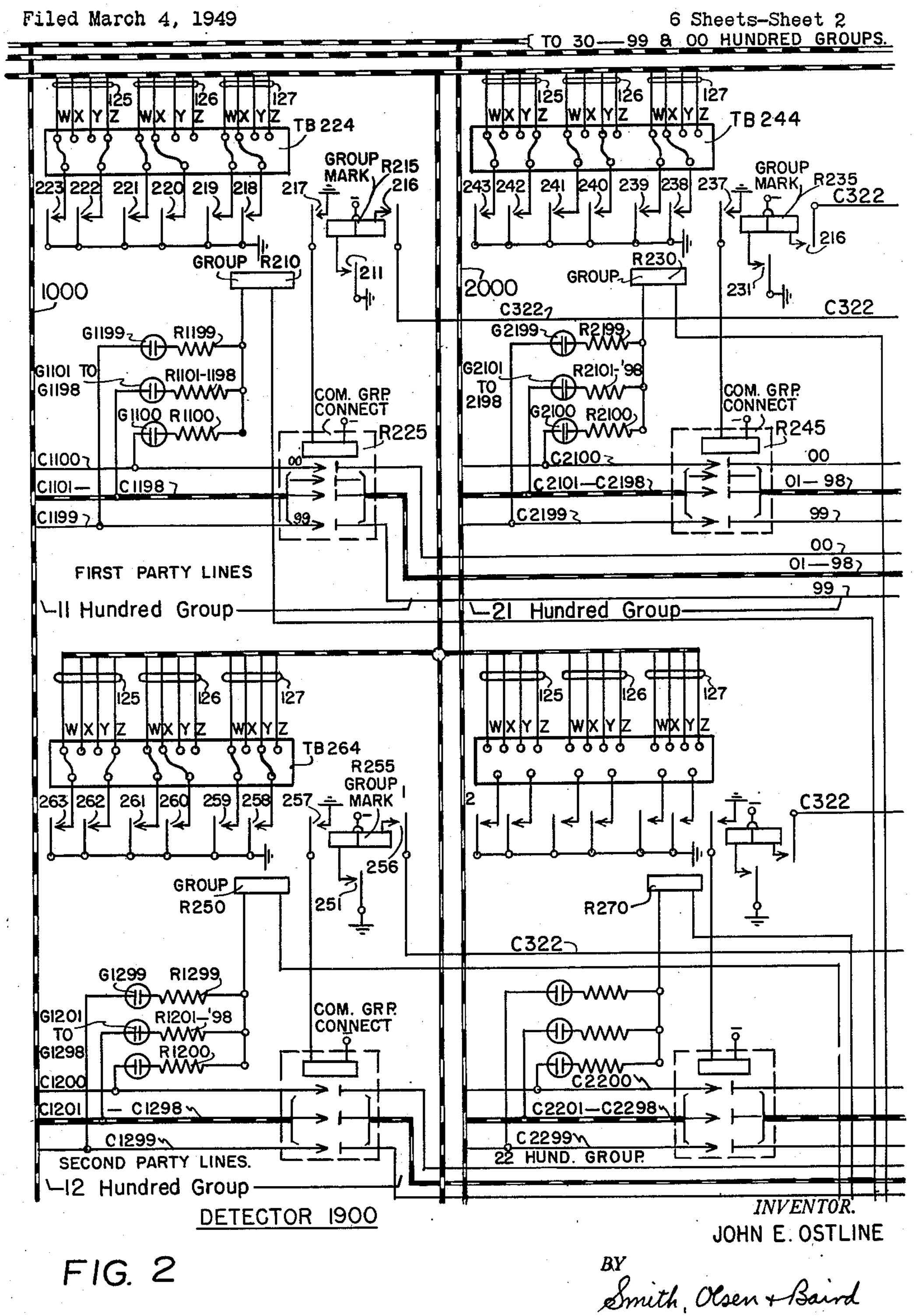
Figure 3:
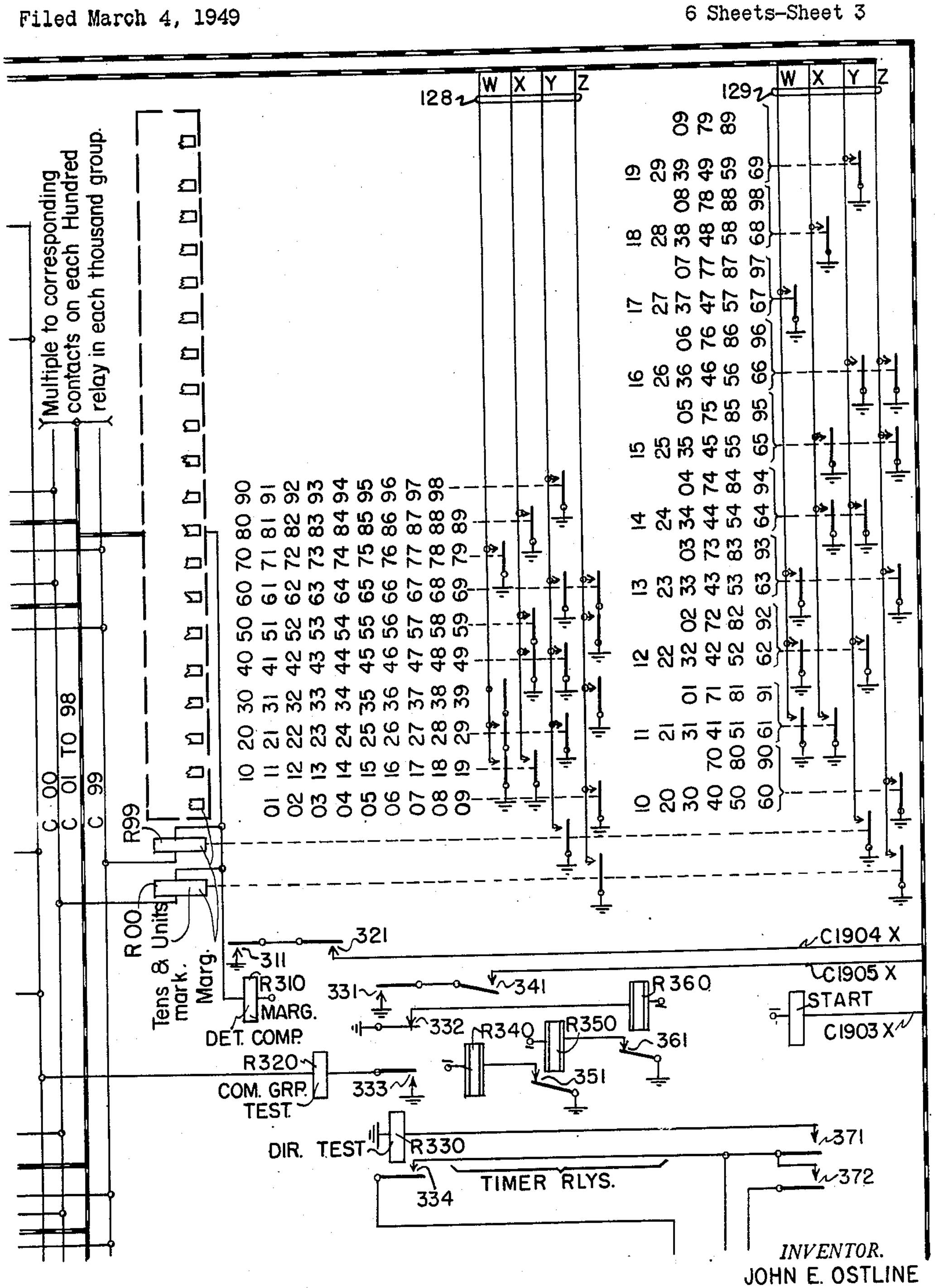
Figure 4:
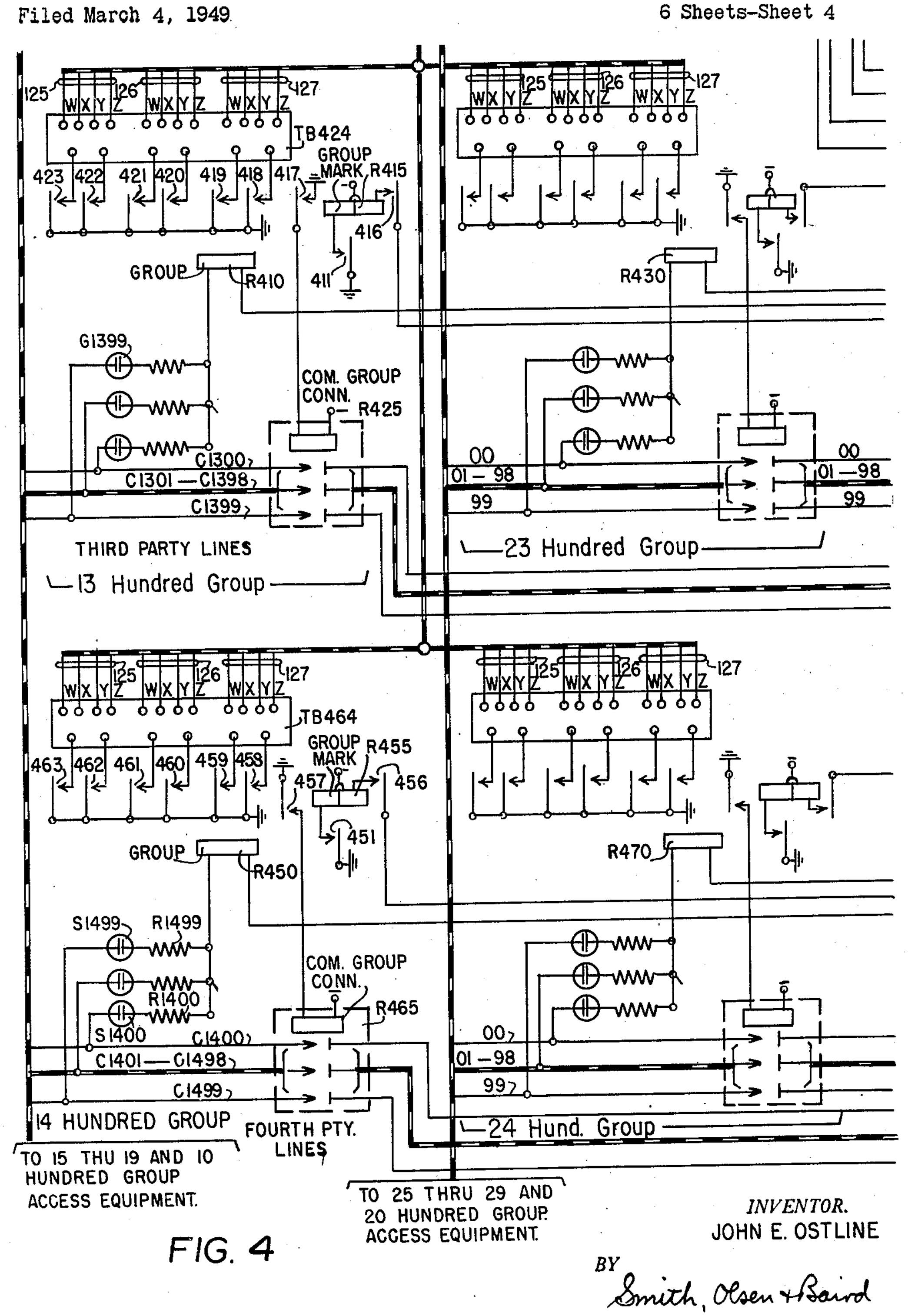
Figure 5:
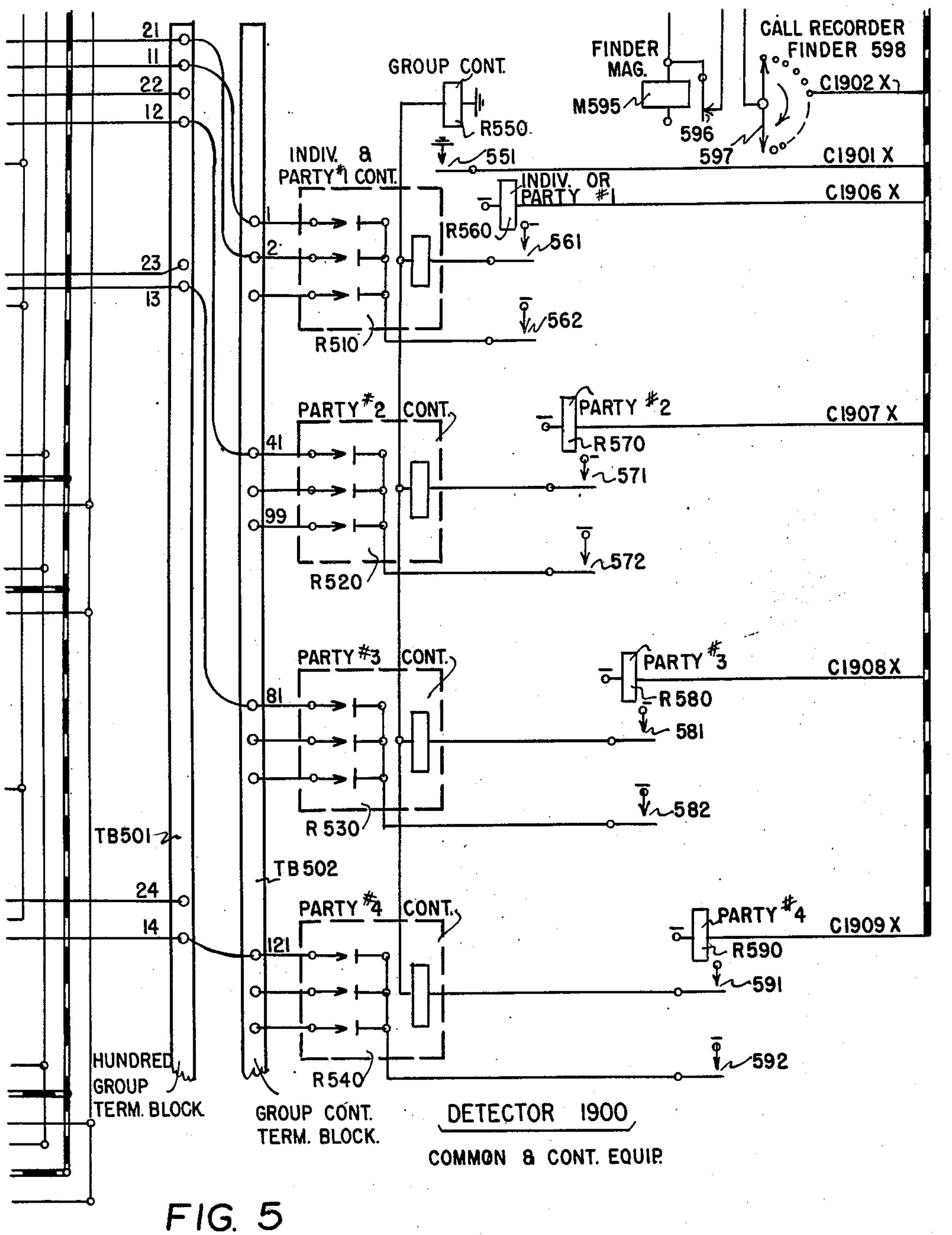

As a further result of the association of the detector 1900 with the call recorder 2000X, the positive 60 volt booster battery 124 is extended over the previously described circuit to the wiper 426X of the finder 440X and then by way of the conductor C103, the line circuit 102, the C conductor of the connector normals in the cable 404 and then to each of the four identifying conductors C1199, C1299, C1399 and C1499 individual to the four stations on the calling party line. The four identifying conductors noted above are respectively connected to the 11 hundred group, the 12 hundred group, the 13 hundred group and the 14 hundred group of relays in the detector 1900, as is illustrated in Figs. 2 and 4. Accordingly, the positive 60 volt booster battery 124 is applied to the G1199, the C1299, the G1399 and the G1499 gas-filled discharge devices of the respective hundred groups. However, inasmuch as the negative 50 volt exchange battery has not been connected to the windings of the group relays R210, R250 and R410 of the 11, 12 and 13 hundred groups, the application of the booster battery potential to these hundred groups is of no consequence and no identification will take place.

In the 14 hundred group of identifying conductors, the negative 50 volt exchange battery has been connected through the winding of the group relay R450 to the multiply connected resistors R1499 to R1400, inclusive. The application of the positive 60 volt booster battery 124 to the identifying conductor C1499 causes the gas-filled discharge device G1499 to break down and thus complete the operating circuit for the group relay R450. The relay R450, at its contacts 451, operates the group marking relay R455 and the latter relay, in turn, registers in code form, the C digit "3," the thousands digit "1" and the hundreds digit "4" in the WXYZ1 to WXYZ4, inclusive, registers in the call recorder 2000X in the manner previously described. At its contacts 456, the group marking relay R455 completes a locking circuit for itself in series with the common group test relay R320 which also operates. Finally, at its contacts 457, the relay R455 completes an operating circuit for the common group control relay R465 which relay, upon operating, connects the 100 tens and units marking relays R00 to R99, inclusive, to the 100 identifying conductors C1400 to C1499, inclusive. The remaining operations of the detector 1900 are substantially the same as has been previously described and it will be understood that the tens and units marking relay R99 will operate in series with the detection complete relay R310 thereby to register the tens digit "9" and the units digits "9" in the WXYZ4 and WXYZ5 registers in the call recorder 2000X and to cause the call recorder 2000X to disconnect the detector 1900.

In view of the foregoing, it will be understood that the detector 1900 has registered the C digit "3" identifying the exchange number of the calling FLorida 3 exchange and the numerical portion of the directory number of the calling party subscriber substation 1499. The subsequent operation of the call recorder 2000X, the director 300X and the ticket repeater 2300X to produce perforated records of the various items of information pertaining to the telephone connection, including the directory number of the calling subscriber substation, is the same as has been previously described.

*Operation of the connector*

In the previous description of operation it was pointed out that the calling subscriber line was marked as busy in the contact banks of the various connectors having access thereto by the application of a ground potential to the C conductor individual to the calling line, such as the C conductor of the connector normals in the cable 401. When the directory number of the calling subscriber line is to be identified by the detector 1900, the busy marking ground potential, applied to the conductor noted above, is removed therefrom and the positive 60 volt booster battery 124 is applied thereto. After the identification has been completed by the detector 1900, the direct ground potential is again replaced on the C conductor individual to the calling line and the booster battery is removed therefrom.

If another subscriber in the telephone system extends a call by way of the local switch train, including the second selector 315X, the third selector 320X and the connector 111, to a called line at a time when the called line is marked as busy by a direct ground potential, the connector 111, which may be a connector of the type disclosed in Fig. 48 in the above-mentioned publication by Kempster B. Miller, will operate in a conventional manner to transmit a busy tone signal to the calling subscriber substation. While such connectors operate entirely satisfactorily in testing a busy called line, it has been found that during the busy testing operation a direct ground potential is momentarily applied to the C wiper of the connector during the process of completing a locking circuit for the busy relay therein. This locking circuit maintains the connector busy relay operated and thus prevent the connector from establishing a talking connection with the busy called line.

From the above brief description of the busy testing operation of a conventional connector it will be understood that the connector momentarily applies ground potential to its C wiper during the time that the busy relay is disconnected from the C wiper and connected to a local locking ground potential. If the positive 60 volt booster battery 124 for identifying purposes is applied to the C conductor and associated identifying conductor of the busy line during this momentary period, the direct ground potential momentarily applied thereto by the calling connector will short-circuit the booster battery potential and thus interfere with the identification operation of the detector 1900. Furthermore, the direct short placed upon the identifying conductor may blow the protecting fuse and thus disconnect the positive 60 volt booster battery identifying potential from the identifying conductor. Further operations of the detector 1900 would then be impossible.

In order to prevent false operation of the detector 1900 and in order to prevent the short-circuiting of the booster battery identifying potential, the locking circuit for the busy relay of the connector shown in Fig. 48 of the Kempster B. Miller publication has been modified as is illustrated in Fig. 7 to include an impedance comprising the upper winding of the busy relay R730. Another modification for the locking circuit of the busy relay is illustrated in Fig. 8 wherein a resistor 814 is included in the circuit between the contact 813 and 832. At this time it may be well to mention that if the resistor 814 is omitted from the circuit of the connector illustrated in Fig. 8, the connector will then correspond precisely to the conventional connector circuit illustrated in Fig. 48 of the above-mentioned Miller publication.

Referring now to Fig. 7, it will be assumed that a calling subscriber in the FLorida 3 exchange has extended a connection by way of the usual local switch train, including the second selector 315X, the third selector 320X to the connector 700 illustrated in Fig. 7. The connector 700 will respond to the next to the last digit of the called subscriber directory number in the usual manner and will raise its wipers 750 to 752, inclusive, to a position opposite a level in the associated bank contact corresponding to the numerical value of the digit received. The last digit of the called subscriber directory number will then control the connector 700 in the usual manner to rotate the wipers over the selected level into engagement with the set of bank contacts terminating the called subscriber line. In the present example it will be assumed that the wipers 750 to 752, inclusive, have been positioned into engagement with the bank contacts terminating the −, the +, and C conductors of the connector normals in the cable 401 individual to the party subscriber line terminating the party subscriber substations TS1-3, TS2-3, TS3-3 and TS4-3. It will also be assumed that one of the party subscriber substations is engaged in establishing a telephone connection and that the positive 60 volt booster battery 124 is applied to the C conductor in the cable 401 for the purpose of operating the detector 1900 to register the directory number of the calling subscriber substation on the party line.

During the receipt of the last digit "9" of the called subscriber directory number, the rotary relay R710 in the connector 700 is in its operated position and when the wiper 750 engages the bank contact terminating the C conductor having the booster battery potential applied thereto, the relay R710, due to its slow-to-release characteristics, connects the lower winding of the busy relay R730 to the wiper 750. The positive 60 volt booster battery 124 applied to the C conductor in the cable 401 and to the identification conductor C1199 is extended by way of the wiper 750, the contacts 712 and 721 and the lower winding of the busy relay R730 to the negative 50 volt exchange battery. The relay R730 immediately operates when the above-traced circuit is completed and prepares, at its contacts 732, a point in the circuit for locking the busy relay R730 in its operated position. The above operations also take place if a busy marking ground is encountered by the wiper 750.

Shortly after the last impulse of the last digit "9" has been received by the connector, the rotary relay R710 slowly restores to normal. During the process of restoring to normal, the contacts 712 and 713 will be closed for a short interval of time. During this interval, a connector of the type illustrated in Fig. 48 in the above-mentioned Miller publication will apply a direct ground potential to the C wiper 750 and thus place a direct short around the positive 60 volt booster battery 124. This direct short may, under certain conditions, interfere with the normal operation of the detector 1900, as described above, in determining the directory number of the calling party subscriber station on the party line and it may disrupt identifying operations of the detector 1900 by blowing out the protecting fuse of the booster battery 124.

In the modified connector circuit arrangement illustrated in Fig. 7, the hold or release relay R740 is in its operated position during the entire period that the connector is in an operated condition. The ground, at contacts 741, is extended by way of the upper winding of the operated busy relay R730 and then by way of the contacts 732, 713 and 721 and the lower winding of the relay R730 to the normal negative exchange battery. In this circuit the upper winding of the relay R730 is energized in series with the lower winding thereby to complete a positive locking circuit to maintain the busy relay in its operated position. A branch of the above-traced circuit, including the upper winding of the relay R730, is also extended by way of the contacts 713 and 712 and the wiper 750 to the C conductor in the cable 401. Since this circuit includes the impedance of the upper winding of the relay R730, the possibility of short-circuiting the booster battery 124 is eliminated. Also, the impedance of the upper winding of the relay R730 prevents the connector of Fig. 7 from interfering with the normal operation of the detector 1900 to identify the directory number of the calling party subscriber substation.

As soon as the rotary relay R710 returns to its normal unoperated position, the impedance of the upper winding of the relay R730 is disconnected from the C wiper 750, at the contacts 712. The busy relay R730, upon operating, transmits the usual busy signal to the subscriber who has attempted to establish a connection with a busy station on the party line.

Referring now to the connector 800 illustrated in Fig. 8, it will be seen that the busy test circuit therein disclosed is substantially identical to that disclosed in the connector 700 illustrated in Fig. 7 except that the busy relay R830 is a single winding relay and the protecting arrangement for preventing a direct ground potential from being momentarily applied to the C wiper 850 is in the form of the resistor 814 included in the branch of the circuit between the contacts 832 and 813. The operation of the connector 800 is precisely the same as that described above in connection with the connector 700 illustrated in Fig. 7 except that the external resistor 814 is included in the locking circuit for the busy relay R830 instead of being included as a winding on the busy relay.

The modification illustrated in Fig. 8 has certain advantages in that it may be applied to any existing connector of the type illustrated in Fig. 48 of the Miller publication without removing and replacing the single winding busy relay R830 with a double winding relay, such as relay R730 illustrated in Fig. 7. In other words, it is only necessary to insert the resistor 814 in the branch of the circuit connecting the contacts 813 and 832.

While the modified connector busy test circuits illustrated in Figs. 7 and 8 have been described in connection with a detector that is designed to operate by the placing of a positive booster battery potential on the identifying conductor of a calling subscriber line, it should be understood that these connectors may also be utilized in detecting arrangements wherein tone signals are utilized for the purpose of detecting the directory number of calling subscriber substations.

*Conclusions*

In view of the foregoing, it is apparent that a telephone system is provided which comprises a detector operative to detect the directory number individual to a calling subscriber substation, which detector incorporates a new and improved circuit arrangement including a two-element gas-filled discharge device which is directively controlled by means of a positive 60 volt booster battery applied to the identifying conductor individual to the substation to tbe identified. It is also apparent from the foregoing that a new and improved busy test circuit has been provided in the connectors having access to lines being identified, which busy test circuit prevents interference with the detecting operation.

While one embodiment of the invention has been disclosed, it will be understood that various modifications may be made therein which are within the true spirit and scope of the invention.

What is claimed is:

1. A line identification circuit for a telephone system having a subscriber line identified by a multi-digit designation, comprising a single gas-filled electronic device individual to said line, said device having only two electrodes, one of said electrodes connected to said line, means controlled over said line responsive to a call initiated thereover for rendering said gas-filled device conducting between said electrodes, a plural digit register, and control means connected to the other of said electrodes and operated responsive to the conductivity of said device for first operating said register to register a portion of the digits of the multi-digit designation of said calling line and for thereafter operating said register to register the remaining portion of the digits of the multi-digit designation of said calling line.

2. A line identification circuit for a telephone system having a subscriber line identified by a multi-digit designation, comprising a single gas-filled electronic device individual to said line, said device having only two electrodes, one of said electrodes connected to said line, means controlled over said line responsive to a call initiated thereover for rendering said gas-filled device conducting between said electrodes, a plural digit register, first control means associated with the other of said electrodes and operated responsive to the conductivity of said device for operating said register to register a portion of the multi-digit designation of said calling line, and additional control means connected to said one electrode responsive to the operation of said first control means and operated in parallel with said device for operating said register to register the remaining portion of the digits of the multi-digit designation of said calling line.

3. A line identification circuit for a telephone system having a subscriber line identified by a multi-digit designation, comprising a single gas-filled electronic device individual to said line, said device having only two electrodes, one of said electrodes connected to said line, means controlled over said line responsive to a call initiated thereover for rendering said gas-filled device conducting between said electrodes, a first marking control means connected to the other of said electrodes operated responsive to the conductivity of said device, a register, means controlled responsive to the operation of said first marking control means for marking said register to register a portion of the multi-digit designation of said calling line, a second marking control device, means also controlled responsive to the operation of said first marking control means for connecting said second marking control means to said line in order to operate said second marking control means, and means controlled responsive to the operation of said second marking control means for marking said register to register the remaining portion of the multi-digit designation of said calling line.

4. A line identification circuit for a telephone system having a subscriber line identified by a designation, comprising a single gas-filled electronic device individual to said line, said device having only two electrodes, one of said electrodes connected to said line, a first source of potential, a second source of potential, means controlled over said line responsive to a call initiated thereover for connecting said first source of potential to said calling line and for connecting said second source of potential to the other of said electrodes, said gas-filled device rendered conducting between said electrodes responsive to said potentials, means connected between said second source of potential and said other electrode operated responsive to the conductivity of said device, a register, and means controlled responsive to the operation of said last-named means for registering in said register the designation of said calling line.

5. A line identification circuit for a telephone system having a subscriber line identified by a multi-digit designation, comprising a single gas-filled electronic device individual to said line, said device having only two electrodes, one of said electrodes connected to said line, a booster battery, an exchange battery, means controlled over said line responsive to a call initiated thereover for connecting said booster battery to said calling line and for connecting said exchange battery to the other of said electrodes in order to render said device conducting between said electrodes, control means connected between said exchange battery and said other electrode operated responsive to the conductivity of said device, a register, and means controlled responsive to the operation of said control means for registering in said register the multi-digit designation of said calling line.

6. An identification circuit for a plurality of subscriber lines of a telephone system comprising in combination, a corresponding plurality of gas-filled discharge devices individual to said lines, each of said discharge devices having only two electrodes, one of the electrodes of each of said discharge devices being connected to the corresponding one of said lines, a register common to all of said lines, a source of potential, means for applying said source of potential to a calling one of said lines to activate only the discharge device individual thereto, and means connected to the other electrode of each of said discharge devices and operated in response to activation of said discharge device individual to said calling line for controlling said register to register the identity of only said calling line.

7. An identification circuit for a plurality of subscriber lines of a telephone system comprising in combination, a corresponding plurality of gas-filled discharge devices individual to said lines, each of said devices having only two electrodes, one of the electrodes of each of said discharge devices being connected to the corresponding one of said lines, a register common to all said lines, a source of potential, means for applying said source of potential to any one of said lines responsive to a call thereon to render the device individual to said calling line conducting between its two electrodes, and a relay connected to the other electrode of said conducting device operated responsive to the conductivity of said device for controlling said register to register the identity of only said calling line.

8. In a telephone system including a group of lines, each of said lines having a multi-digit identifying number individual thereto, a single identifying conductor individual to each of said lines, a single gas-filled two-element discharge device individual to each of said identifying conductors, means responsive to a call from any one of said lines for impressing a potential on the identifying conductor individual thereto for rendering the associated device conducting between its two elements, a first group of marking conductors, a relay connected to one of the elements of all of said devices and operated responsive to the conductivity between the two elements of any one of said devices, means controlled responsive to the operation of said relay for marking said first group of marking conductors in accordance with certain of the digits of the multi-digit identifying number of said calling line, a second group of marking conductors, a marking control means individual to each of said lines, means controlled responsive to the operation of said relay for connecting each one of said marking control means to the individual identifying conductor corresponding to its associated line to operate only the one of said marking control means connected to said identifying conductor having said potential applied thereto, and means controlled responsive to the operation of said one marking control means for marking said second group of marking conductors in accordance with the remaining digits of the multi-digit identifying number of said calling line.

9. In a telephone system including a group of lines, each of said lines having a multi-digit identifying number individual thereto, a single identifying conductor individual to each of said lines, a single gas-filled two-element discharge device individual to each of said identifying conductors, means responsive to a call from any one of said lines for impressing a potential on the identifying conductor individual thereto for rendering the associated device conducting between its two elements, a first group of marking conductors, a relay connected to one of the elements of all of said devices and operated responsive to the conductivity between the two elements of any one of said devices, means controlled responsive to the operation of said relay for marking said first group of marking conductors in accordance with certain of the digits of the multi-digit identifying number of said calling line, a second group of marking conductors, a marking control means individual to each one of said lines, means controlled responsive to the operation of said relay for connecting each of said marking control means to the individual identifying conductor corresponding to its associated line to operate only the one of said marking control means connected to said identifying conductor having said potential applied thereto, means controlled responsive to the operation of said one marking control means for marking said second group of marking conductors in accordance with the remaining digits of the multi-digit identifying number of said calling line, and register means operated in accordance with the markings on said first group and said second group of marking conductors to register the multi-digit identifying number of said calling line.

10. In a telephone system including a group of lines, each of said lines having a multi-character designation individual thereto, a single identifying conductor individual to each of said lines, a single control device individual to each of said conductors, a first relay common to all of said control devices, means responsive to a predetermined condition on one of said lines in said group for impressing a potential on the said identifying conductor individual thereto to operate only the associated one of said control devices and to operate said first relay, a plurality of groups of marking conductors, a second relay individual to each of said identifying conductors, means controlled responsive to the operation of said first relay for marking a first portion of said groups of marking conductors in accordance with a first portion of the multi-character designation of only said one line and for connecting each one of said second relays to its associated identifying conductor to operate the one of said second relays associated with the one of said identifying conductors having said potential impressed thereon, and means controlled responsive to the operation of said one second relay for marking another portion of said groups of marking conductors in accordance with another portion of the multi-character designation of only said one line.

11. In a telephone system including a group of lines, each of said lines having a multi-character designation individual thereto, a single identifying conductor individual to each of said lines, a single control device connected to each of said conductors, means controlled responsive to a predetermined condition on a line in said group for impressing a potential on the one of said identifying conductors individual thereto in order to operate only the associated control device, a plurality of groups of marking conductors, a single relay for individual to each of said identifying conductors, means controlled responsive to the operation of said control device for applying a predetremined marking to one or more of the conductors in certain of said groups of marking conductors, means also controlled responsive to the operation of said control device for connecting each one of said relays to its identifying conductor so that the potential applied to said one identifying conductor operates only the one of said relays connected thereto, means controlled by said one operated relay for applying a predetermined marking to one or more of the conductors in certain other of said groups of marking conductors, and means controlled responsive to said predetermined markings on said marking conductors for registering the multi-character designation of said one line having said predetermined condition thereon.

12. In a telephone system, an exchange having a group of lines extending thereto, each of the lines in said group having an individual designation comprising a given number of digits of particular numerical values, a detector having a single identifying conductor connected to each of the lines in said group and comprising a single two-element gas-filled discharge device connected to each of said identifying conductors, an individual relay for each of said identifying conductors, means responsive to a call on any one of said lines for applying a marking potential to the associated identifying conductor in order to render the associated gas-filled discharge device conducting between its two-elements, a first control relay common to all of said identifying conductors operated in response to the conductivity of any one of said devices, means controlled responsive to the operation of said first control relay for connecting said individual relays respectively with corresponding ones of said identifying conductors in order to operate the one of said individual relays connected to the one of said identifying conductors having said marking potential applied thereto, a second control relay common to all of said individual relays operated in conjunction with any operated one of said individual relays, means controlled responsive to the operation of said first control relay and said one individual relay for registering the digits of the designation of said one calling line, and means controlled in response to the operation of said second control relay for releasing said detector.

13. In a telephone system, a plurality of groups of lines, a like plurality of group relays, an identifying conductor connected to each of said lines, a single two-electrode gas-filled discharge device for each of said lines, one of the electrodes of each of said devices connected to the identifying conductor of its associated line and the other electrode of each of said devices connected to the one of said group relays corresponding to the associated group of lines, a source of potential, means responsive to a calling condition on one of said lines for connecting said source of potential to the identifying conductor individual thereto in order to render the connected one of said gas-filled discharge devices conducting between its two electrodes and to operate only the one of said group relays corresponding to the group of lines including said calling line, and means controlled by said one operated group relay for registering the identity of the group of lines including said calling line and the identity of said particular calling line in said identified group of lines.

14. In a telephone system, a plurality of groups of lines, a like plurality of group relays, an identifying conductor connected to each of said lines, a single two-electrode gas-filled discharge device for each of said lines, one of the electrodes of each of said devices connected to the identifying conductor of its associated line and the other electrode of each of said devices connected to the one of said group relays corresponding to the associated group of lines, a source of potential, means responsive to a calling condition on one of said lines for connecting said source of potential to the identifying conductor individual thereto in order to render the connected one of said gas-filled discharge devices conducting between its two electrodes and to operate only the one of said group relays corresponding to the group of lines including said calling line, a group of secondary relays corresponding in number to the number of lines in any one of said groups of lines and arranged to be selectively connected to each of said groups of lines, and means controlled responsive to the operation of said one group relay for connecting said group of secondary relays to the identifying conductors of each of the corresponding lines in the group of lines including said calling line in order to operate only the one of said secondary relays connected to the one of said identifying conductors having said source of potential applied thereto, and means governed by said operated group relay and said operated secondary relay for registering the identity of said group of lines and the identity of the particular line in said group having said calling condition thereon.

15. In a telephone system, an exchange having a group of lines extending thereto, switching apparatus, a plurality of register senders, means for associating an idle one of said register senders with a calling one of said lines and for operating said one register sender in accordance with a called line number, means in said one register sender for controlling said switching apparatus to set up a connection in accordance with said called number; an identifier comprising a single identifying conductor connected to each of said lines in said group, a single gas-filled discharge device connected to each of said conductors, a common identifying relay connected to all of said devices, means controlled by said one register sender for connecting said identifier therewith and for applying a potential to said calling line identifying conductor in order to operate only the associated gas-filled discharge device and said common identifying relay, an individual identifying relay for each of said lines in said group of lines, means controlled responsive to the operation of said common identifying relay for connecting said individual identifying relays to corresponding ones of said identifying conductors in order to operate only the one of said individual identifying relays connected to said calling line identifying conductor, and means controlled by said operated common identifying relay and said operated individual identifying relay for registering the identity of said calling line.

16. In a telephone system, an exchange having a group of lines extending thereto, switching apparatus, a plurality of register senders, means for associating an idle one of said register senders with a calling one of said lines and for operating said one register sender in accordance with a called line number, means in said one register sender for controlling said switching apparatus to set up a connection in accordance with said called number; an identifier comprising a single identifying conductor connected to each of said lines in said group, a single gas-filled discharge device connected to each of said conductors, a common identifying relay connected to all of said devices, means controlled by said one register sender for connecting said identifier therewith and for applying a potential to said calling line identifying conductor in order to operate only the associated gas-filled discharge device and said common identifying relay, an individual identifying relay for each of said lines in said group of lines, means controlled responsive to the operation of said common identifying relay for connecting said individual identifying relays to corresponding ones of said identifying conductors in order to operate only the one of said individual identifying relays connected to said calling line identifying conductor, means controlled by said operated common identifying relay and said operated individual identifying relay for registering the identity of said calling line, and means connected to all of said individual relays and operated each time one of said individual identifying relay is operated for disconnecting said identifier from said one register sender in order to render said identifier available to other register senders.

17. In a telephone system, an exchange having a group of lines extending thereto, switching apparatus, a plurality of register senders, means for associating an idle one of said register senders with a calling one of said lines and for operating said one register sender in accordance with a called line number, means in said one register sender for controlling said switching apparatus to set up a connection in accordance with said called number; an identifier comprising a single identifying conductor connected to each of said lines in said group, a single gas-filled discharge device connected to each of said conductors, a common identifying relay connected to all of said gas discharge devices, means controlled by said one register sender for connecting said identifier therewith and for applying a potential to said calling line identifying conductor in order to operate only the associated gas-filled discharge device and said common identifying relay, an individual identifying relay for each of said lines in said group of lines, a control relay common to all of said individual identifying relays, means controlled responsive to the operation of said common identifying relay for connecting said individual relays to corresponding ones of said identifying conductors in order to operate only the particular one of said individual identifying relays corresponding to said calling line and said control relay, means controlled responsive to the operation of said common identifying relay and said one individual particular identifying relay for registering the identity of said calling line, and means controlled by said operated control relay for disconnecting said identifier from said one register sender.

18. In a telephone system, an exchange having a group of lines extending thereto, switching apparatus, a plurality of register senders, means for associating an idle one of said register senders with a calling one of said lines and for operating said one register sender in accordance with a called line number, means in said one register sender for controlling said switching apparatus to set up a connection in accordance with said called number; an identifier comprising a single identifying conductor connected to each of said lines in said group, a single gas-filled discharge device connected to each of said conductors, a common identifying relay connected to all of said devices, means controlled by said one register sender for connecting said identifier therewith and for applying a potential to said calling identifying conductor in order to operate only the associated gas-filled discharge device and said common identifying relay, an individual identifying relay for each of said lines in said group of lines, means controlled responsive to the operation of said common identifying relay for connecting said individual identifying relays to corresponding ones of said identifying conductors in order to operate only the one of said individual identifying relays connected to said calling line identifying conductor, means controlled by said operated common identifying relay and said operated individual identifying relay for registering the identity of said calling line, a timer having a predetermined fixed time cycle included in said identifier, means for starting said time cycle in response to the association of said identifier with said one register sender, and means controlled either responsive to the operation of said individual identifying relay or by said timer at the end of said predetermined fixed time cycle for disconnecting said identifier from said one register sender to render said identifier available for use by another register sender.

19. In a line identification circuit for a telephone line having a plurality of stations, each of said stations having an individual multi-character designation, a gas-filled discharge device individual to each of said stations, each of said gas-filled discharge devices having only a first and a second electrode, said first electrode of each of said devices connected to said line, means responsive to a call on said line from a given one of said stations for selecting said second electrode of said gas-filled discharge device individual to said given station, an identifying potential, means also responsive to a call on said line for applying said identifying potential to said first electrode of each of said gas-filled discharge devices in order to render the said selected one of said discharge devices conductive between its first and second electrodes, and means connected to said second electrode operated responsive to the conductivity of said selected one of said devices for registering the multi-character designation of said given station on said line.

20. In a telephone system, a party line, a plurality of stations on said party line, a plurality of terminals individual to the various stations on said party line having corresponding individual multi-digit designations, apparatus controllable from any calling one of said stations for extending a connection from said party line and for registering the position of the calling station on said party line; a detector, an identifying conductor individual to the various stations on said party line interconnecting said detector and the terminal individual to the various stations, a network in said detector for each of said stations including a gas-filled discharge device having only a first and a second electrode and a relay, said first electrode of each of said devices connected to said identifying conductor individual to the corresponding one of said stations on said party line, means controlled responsive to a call on said party line for applying an identifying potential to each of said identifying conductors, means in said detector operated in accordance with the registered position of the calling one of the stations on said party line for selecting the relay and second electrode of the device included in the one of said networks corresponding to said calling station, means controlled responsive to said selection for causing the potential applied to said identifying conductors to render the said device conductive between its first and second electrodes and to operate the said relay in the said selected one of said networks, and means controlled responsive to the operation of said relay for registering the multi-digit terminal designation individual to the said calling station on said party line.

21. In a telephone system, a plurality of party lines, a number of stations on each of said party lines, each of said party lines being provided with a number of terminals individually corresponding to the stations thereon and having individual multi-digit designations, corresponding ones of the terminals of said party lines being arranged in a number of groups, whereby the various terminals in a given group correspond to similarly positioned stations on said party lines, a detector, an identifying conductor individual to each of said terminals and terminating in said detector, a gas-filled discharge device having only a first and a second electrode individual to each of said stations, said first electrode of each of said devices connected to said identifying conductor individual to the corresponding station terminal, a plurality of group relays, each of said group relays being commonly connected to all of said second electrode of the discharge devices corresponding to a group of said terminals of similarly positioned stations on said party lines, means responsive to the extension of a call from a given station on a given party line for selecting one of said group relays for operation, means also responsive to the extension of said call for applying an identifying potential to said calling party line and to all of the identifying conductors individual to the various stations on said calling party line in order to render conductive between its first and second electrodes the one of said discharge devices included in the group commonly connected to said selected group relay, said selected group relay being operated responsive to the conductivity of said one discharge device, and means controlled responsive to the operation of said group relay for registering the multi-digit designation of the terminal of said calling station on said party line.

22. An identification circuit for the subscriber lines of a telephone system comprising in combination, a single glow lamp individual to each of said lines, each of said glow lamps having only two electrodes, a register common to all of said lines, a source of potential, a relay connected in series with one of said electrodes of all of said glow lamps, means responsive to the extension of a call over one of said lines for applying said source of potential to said one line and to the other of said electrodes of said glow lamp individual thereto to render said lamp conductive between its two electrodes and to operate said relay, a plurality of marking conductors for controlling said register, and means controlled responsive to the operation of said relay for selectively marking said marking conductors in accordance with the identity of said calling line, whereby said register is selectively operated to register said calling line identity.

23. An identification circuit for the subscriber lines of a telephone system comprising in combination, a single glow lamp individual to each of said lines, each of said glow lamps having only two electrodes, a resistor connected to one of said electrodes of each of said lamps, a first relay commonly connected to each of said resistors, a second relay individual to each of said lines, means responsive to a call on one of said lines for applying a potential thereto to operate said first relay in series with said two electrodes of said glow lamp and the said resistor individual to said calling line, means controlled responsive to the operation of said first relay for connecting all of said second relays to their respective lines in order to cause the said potential applied to said calling line to operate the one of said second relays individual to said calling line, and means controlled responsive to the operation of said first relay and said second relay for registering the identity of said calling subscriber line.

24. In a telephone system, a first line having a multi-character designation, switching apparatus operable from said first line to extend a connection to another line, a connector operative to extend a connection to said first line, an identifier operative to identify the multi-character designation of said first line, an identifying conductor individual to said first line and multiply connected to said identifier and to a terminal accessible to said connector, means responsive to the operation of said switching apparatus to extend a connection from said first line for placing a first busy marking potential on said identifying conductor and for thereafter substituting an identifying marking potential on said identifying conductor, means in said identifier only operated responsive to said identifying potential for registering the multi-character designation of said first line, means for operating said connector to engage said terminal terminating said identifying conductor, a busy relay in said connector operated in the event said identifying conductor is marked with either said busy marking potential or said identifying potential to transmit a signal indicating that said first line is busy, a locking circuit for said busy relay including a source of locking potential, means for connecting said locking circuit and said locking potential to said identifying conductor and to said busy relay, and means included in said locking circuit for preventing said source of locking potential from interfering with the identifying potential applied to said identifying conductor.

25. In a telephone system, a subscriber line, a connector having access to said line, a test circuit for said connector for determining the busy condition of said line, means responsive to a call on said line and controlled thereover for setting up a connection from said line to another line, means for identifying the directory number of said calling line, an identifying conductor individual to said calling line, means also responsive to said call for marking said identifying conductor with a first potential to indicate that said calling line is busy, means controlled during the setting up of said connection for marking said identifying conductor with a second potential to indicate that said calling line is busy and to control said identifying means to identify the directory number of said calling line, means for operating said connector to select said identifying conductor, a relay in said connector, means in said connector operated responsive to said selection for operating said relay to connect said test circuit to said identifying conductor, means included in said test circuit operated by either said first potential or said second potential on said identifying conductor for indicating the busy condition of said subscriber line, a locking potential corresponding to said first potential, a locking circuit controlled by said busy indicating means and said relay for locking said busy indicating means in its operated position to said locking potential, and means included in said locking circuit for preventing said locking potential from interfering with said second potential on said identifying conductor and the operation of said identifier.

26. In a telephone system, a first line having a multi-character designation, switching apparatus operable from said first line to extend a connection to another line, a connector operative to extend a connection to said first line, an identifier operative to identify the multi-character designation of said first line, an identifying conductor individual to said first line and multiply connected to said identifier and to a terminal accessible to said connector, means responsive to the operation of said switching apparatus to extend a connection from said first line for placing a first busy marking potential on said identifying conductor and for thereafter substituting an identifying marking potential on said identifying conductor, means in said identifier only operated responsive to said identifying potential for registering the multi-character designation of said first line, means for operating said connector to engage the terminal terminating said identifying conductor, a busy relay having two windings in said connector operated over a circuit including one of said windings in the event said identifying conductor is marked with either said busy marking potential or said identifying potential to transmit a signal indicating that said first line is busy, a locking circuit for said busy relay including a source of locking potential, and means for connecting said locking circuit and said locking potential to said identifying conductor and to said busy relay so that said other winding of said busy relay prevents said source of locking potential from interfering with the identifying potential applied to said identifying conductor.

JOHN E. OSTLINE.

References Cited in the file of this patent

UNITED STATES PATENTS

| Number | Name | Date |
|---|---|---|
| 1,781,385 | Hague | Nov. 11, 1930 |
| 1,864,524 | Bragg | June 28, 1932 |
| 2,252,766 | Holden | Aug. 19, 1941 |
| 2,270,246 | Bascom et al. | Jan. 20, 1942 |
| 2,319,424 | Maloney | May 18, 1943 |
| 2,338,242 | Haigh | Jan. 4, 1944 |
| 2,348,131 | Horton | May 2, 1944 |
| 2,426,981 | Blake | Sept. 9, 1947 |
| 2,447,533 | Retallack | Aug. 24, 1948 |
| 2,484,612 | Dehn et al. | Oct. 11, 1949 |
| 2,490,441 | Joel | Dec. 6, 1949 |
| 2,570,238 | Horwitz | Oct. 9, 1951 |